US012797817B2

(12) United States Patent
Okada et al.

(10) Patent No.: US 12,797,817 B2
(45) Date of Patent: Nov. 17, 2026

(54) HYDROGEN STATION AND HYDROGEN PRODUCING METHOD

(71) Applicant: Chiyoda Corporation, Yokohama (JP)

(72) Inventors: Yoshimi Okada, Yokohama (JP); Kenichi Imagawa, Yokohama (JP); Tomoyuki Mikuriya, Yokohama (JP); Hironori Kawai, Yokohama (JP); Yusuke Nakajima, Yokohama (JP)

(73) Assignee: CHIYODA CORPORATION, Yokohama (JP)

(*) Notice: Subject to any disclaimer, the term of this patent is extended or adjusted under 35 U.S.C. 154(b) by 827 days.

(21) Appl. No.: 18/026,720

(22) PCT Filed: Apr. 16, 2021

(86) PCT No.: PCT/JP2021/015769
§ 371 (c)(1),
(2) Date: Mar. 16, 2023

(87) PCT Pub. No.: WO2022/219822
PCT Pub. Date: Oct. 20, 2022

(65) Prior Publication Data
US 2023/0356165 A1 Nov. 9, 2023

(51) Int. Cl.
*B01J 8/00* (2006.01)
*B01J 8/06* (2006.01)
(Continued)

(52) U.S. Cl.
CPC ............... *B01J 8/067* (2013.01); *B01J 8/001* (2013.01); *B01J 35/394* (2024.01); *B01J 35/615* (2024.01);
(Continued)

(58) Field of Classification Search
CPC . B01J 8/067; B01J 8/001; B01J 35/394; B01J 35/615; B01J 35/635; B01J 35/651;
(Continued)

(56) References Cited

U.S. PATENT DOCUMENTS

2005/0003248 A1 1/2005 Matsuda et al.
2009/0148381 A1 6/2009 Sumida et al.
2016/0214858 A1* 7/2016 Cooper ..................... C01B 3/26

FOREIGN PATENT DOCUMENTS

CN 1208292 C * 6/2005 ............... C07C 5/48
CN 103958955 A * 7/2014 ............... C01B 3/38
(Continued)

OTHER PUBLICATIONS

CN-110282600A—machine translation (Year: 2026).*
(Continued)

*Primary Examiner* — Huy Tram Nguyen
(74) *Attorney, Agent, or Firm* — Armstrong Teasdale LLP

(57) ABSTRACT

A hydrogen station includes: a dehydrogenation reactor that produces hydrogen by dehydrogenation reaction of a hydrogenated aromatic in presence of a dehydrogenation catalyst; a heat supply device that supplies heat to the dehydrogenation reactor via a heat medium heated by using fuel; and a PSA device that purifies a reaction product gas in the dehydrogenation reactor by using an adsorbent according to a pressure swing adsorption method, wherein the PSA device is supplied with a purge gas containing hydrogen used in regeneration of the adsorbent, the heat supply device includes a storage tank storing the heat medium and a catalytic combustion tube disposed in the storage tank to catalytically combust the fuel in presence of a combustion catalyst, and the catalytic combustion tube is supplied with the purge gas discharged from the PSA device as the fuel together with air.

10 Claims, 6 Drawing Sheets

(51) Int. Cl.

| | |
|---|---|
| ***B01J 35/30*** | (2024.01) |
| ***B01J 35/61*** | (2024.01) |
| ***B01J 35/63*** | (2024.01) |
| ***B01J 35/64*** | (2024.01) |
| ***C01B 3/26*** | (2006.01) |

(52) U.S. Cl.

CPC ........... *B01J 35/635* (2024.01); *B01J 35/651* (2024.01); *C01B 3/26* (2013.01); *C01B 2203/0277* (2013.01); *C01B 2203/0425* (2013.01); *C01B 2203/0827* (2013.01); *C01B 2203/0833* (2013.01); *C01B 2203/1017* (2013.01); *C01B 2203/107* (2013.01); *C01B 2203/1082* (2013.01); *C01B 2203/1252* (2013.01)

(58) Field of Classification Search

CPC ...... B01J 21/04; B01J 35/647; B01J 37/0201; B01J 37/08; B01J 37/16; B01J 23/42; B01J 8/1836; B01J 35/60; C01B 3/26; C01B 2203/0277; C01B 2203/0425; C01B 2203/0827; C01B 2203/0833; C01B 2203/1017; C01B 2203/107; C01B 2203/1082; C01B 2203/1252; C01B 2203/043; C01B 2203/048; C01B 2203/066; C01B 2203/1005; C01B 3/0015; C01B 3/38; Y02E 60/32; Y02E 60/30

USPC .......................................................... 422/187

See application file for complete search history.

(56) References Cited

FOREIGN PATENT DOCUMENTS

| | | | | | |
|---|---|---|---|---|---|
| CN | 110282600 | A | * | 9/2019 | ............... B67D 7/76 |
| JP | H0672005 | B2 | | 9/1994 | |
| JP | 2004277189 | A | | 10/2004 | |
| JP | 2004352511 | A | | 12/2004 | |
| JP | 2006052110 | A | | 2/2006 | |
| JP | 2007076992 | A | | 3/2007 | |
| JP | 4142733 | B2 | * | 9/2008 | ............ B01J 27/045 |
| JP | 2009056371 | A | | 3/2009 | |
| JP | 2009221033 | A | | 10/2009 | |
| JP | 4652695 | B2 | * | 3/2011 | |
| JP | 2015182919 | A | | 10/2015 | |
| JP | 2015227255 | A | | 12/2015 | |
| JP | 2015227257 | A | | 12/2015 | |
| JP | 2016000679 | | * | 1/2016 | ............... C01B 3/26 |
| JP | 2016000679 | A | * | 1/2016 | |
| JP | 2017065937 | A | | 4/2017 | |
| WO | 2016158437 | A1 | | 10/2016 | |

OTHER PUBLICATIONS

JP-4652695B2—machine translation (Year: 2026).*
CN-103958955A—Machine (Year: 2026).*
CN-1208292C—machine (Year: 2026).*
JP-4142733B2—machine (Year: 2026).*
Extended European Search Report for European Patent Application No. 21937016.0 dated May 27, 2025; 9 pp.
Office Action for Japanese Patent Application No. 2023-514315 received Mar. 19, 2024; 6 pps.
International Search Report for PCT Patent Application PCT/JP2021/015769 mailed Jun. 29, 2021; 3 pp.
Office Action for Taiwan Patent Application 111110317 received Jan. 16, 2023; 6 pp.
Okada, Yoshimi, H2 Storage and Transportation Technology by Organic Chemical Hydride Method and Future Prospects; Energy and Resources, vol. 39, No. 3, 2018; pp. 168-173.
Okada, Yoshimi, Technology Development and Future Prospects for Large-Scale Hydrogen Storage & Transportation (1); Bulletin of the High Pressure Gas Safety Institute of Tokyo, August and Sep. 2019; 21 pp.
Examination Report for Australian Patent Application No. 2021441047 dated May 30, 2024; 3 pp.
First Office Action for Chinese Patent Application No. 202180063777.0 dated Jul. 8, 2024; 29 pp.

* cited by examiner

HD-2000 200kV 1.8 million times (A)

JEM-ARM200 200kV 2 million times (B)

HYDROGEN STATION AND HYDROGEN PRODUCING METHOD

CROSS-REFERENCE TO RELATED APPLICATION

This application is a U.S. national stage application of PCT/JP2021/015769, filed on Apr. 16, 2021, which is hereby expressly incorporated by reference in its entirety.

TECHNICAL FIELD

The present invention relates to a hydrogen station and a hydrogen producing method for supplying hydrogen to a moving body equipped with a fuel cell, such as a fuel cell vehicle (FCV), a fuel cell forklift, etc.

BACKGROUND ART

Hydrogen stations for refilling a moving body equipped with a fuel cell, such as a fuel cell vehicle, etc. with hydrogen are being prepared according to the basic hydrogen strategy of Japanese government. Currently, hydrogen stations for FCV are in operation at about 110 locations, and it is aimed to deploy hydrogen stations at 900 locations by 2030, focusing on the four major metropolitan areas. It is expected that in the end, hydrogen stations will become necessary at about 15,000 locations, similarly to current gas stations. After 2030, it is necessary to spread hydrogen stations not only in the four major metropolitan areas but all over the country including remote islands. Currently, hydrogen stations that are put into practical use adopt a compressed hydrogen method or a liquid hydrogen method for storage and transportation of hydrogen.

On the other hand, there is an organic chemical hydride method as one method for storing/transporting hydrogen (see Non-Patent Documents 1 and 2). The organic chemical hydride method (OCH method) is a method in which hydrogen is subjected to hydrogenation react with an aromatic such as toluene (TOL) and converted to a saturated cyclic compound (hydrogenated aromatic) such as methylcyclohexane (MCH) having the hydrogen taken in the molecule thereof so that “storage” and “transportation” are achieved in a liquid state under normal temperature and normal pressure and a necessary amount of hydrogen is taken out by dehydrogenation reaction of the saturated cyclic compound and used at the place of use. Namely, the OCH method includes a hydrogenation reaction (hydrogen storage reaction) for causing hydrogen and TOL to react, and a dehydrogenation reaction (hydrogen producing reaction) for generating hydrogen from MCH and recovering TOL, for example, and TOL generated after taking out hydrogen can be recovered and repeatedly used as a container (carrier) of hydrogen.

In the OCH method, the dehydrogenation reaction for producing hydrogen from the saturated cyclic compound after transportation is an endothermic reaction, and therefore, it is necessary to input heat from outside. Accordingly, in the dehydrogenation reaction, a method of causing a heated liquid heat medium, such as hot oil, to circulate on the outside of reaction tubes filled with a dehydrogenation catalyst is used to put in a necessary amount of heat to maintain a predetermined reaction temperature condition (for example, a reaction temperature of 300 to 400° C.). Here, as a method for heating the hot oil, a method of heating the piping in which the hot oil flows by direct fire using the flame generated by fuel combustion in the heating furnace may be conceived (see Patent Document 1). However, it is preferred for safety to avoid use of direct fire on the premises of the hydrogen station, in which combustible hydrogen is dealt with, as much as possible.

Also, if fossil fuel such as natural gas or kerosene is used as a fuel used in the heating of the hot oil, the carbon content of the fuel will be discharged as $CO_2$, and thus, there is a problem that the significance of use of hydrogen is reduced. Further, since an ignition source is necessary for the fuel combustion, there is a problem that the risk due to the ignition source cannot be avoided by only avoiding use of the burner of the heating furnace.

PRIOR ART DOCUMENT(S)

Patent Document(s)

Non-Patent Document 1: OKADA Yoshimi, Energy/Natural Resources, Vol. 33, No. 3, 168 (2018)
Non-Patent Document 2: OKADA Yoshimi, Bulletin of The High Pressure Gas Safety Institute of TOKYO, August and September 2019
Patent Document 1: JP2015-182919A

SUMMARY OF THE INVENTION

Task to be Accomplished by the Invention

Under the above background, the present inventors carried out extensive research on a method for avoiding use of direct fire and suppressing $CO_2$ emission when using a heated heat medium to input heat to the dehydrogenation reaction of hydrogenated aromatics executed in the hydrogen station.

As a result, the present inventors found that by purifying the reaction product gas containing hydrogen obtained from the dehydrogenation reaction with a PSA device that uses a PSA method (pressure swing adsorption method) and by catalytically combusting the purge gas (containing a high concentration of hydrogen) used to perform regeneration operation of the column (adsorption tower) of the PSA device (namely, removal of impurities adsorbed on the adsorbent packed in the column), it is possible to heat the heat medium with the combustion heat without generating a flame. Thereby, the $CO_2$ emission from the hydrogen station can be suppressed while avoiding use of direct fire or the like that can be an ignition source in the hydrogen station. Further, the present inventors found that it is preferred to jointly use a highly active platinum catalyst as a combustion catalyst for catalytic combustion of the purge gas so that the purge gas can spontaneously ignite even in cold regions.

Thus, an object of the present invention is to provide a hydrogen station and a hydrogen producing method which, when a heated heat medium is used to input heat to the dehydrogenation reaction of hydrogenated aromatics, can avoid use of direct fire and suppress $CO_2$ emission in the heating of the heat medium.

Means to Accomplish the Task

One aspect of the present invention is a hydrogen station (1), comprising: a dehydrogenation reactor (23) that produces hydrogen by dehydrogenation reaction of a hydrogenated aromatic in presence of a dehydrogenation catalyst; a heat supply device (26) that supplies heat to the dehydrogenation reactor via heat medium heated by using fuel; and a PSA device (33) that purifies a reaction product gas containing hydrogen produced by the dehydrogenation reactor, by using an adsorbent according to a pressure swing adsorption method, wherein the PSA device is supplied with a purge gas containing hydrogen used in regeneration of the adsorbent, the heat supply device comprises a storage tank (27) that stores the heat medium and a catalytic combustion tube (28) that is disposed in the storage tank to catalytically combust the fuel in presence of a combustion catalyst, and the catalytic combustion tube is supplied with the purge gas discharged from the PSA device as the fuel together with air.

According to this aspect, when the heated heat medium is used to input heat to the dehydrogenation reaction of hydrogenated aromatics, the heat medium is heated by catalytically combusting the purge gas that has been used in the regeneration of the adsorbent in the PSA device, and therefore, it is possible to avoid use of direct fire and suppress $CO_2$ emission in the heating of the heat medium.

In the above aspect, preferably, the dehydrogenation catalyst includes a platinum-loaded alumina catalyst, and the platinum-loaded alumina catalyst comprises: an alumina carrier; and platinum loaded on the alumina carrier, wherein the alumina carrier comprises a y-alumina carrier that has a surface area of 200 $m^2/g$ or more, a pore volume of 0.50 $cm^3/g$ or more, and an average pore diameter in a range of 60 to 150 A, with pores having a pore diameter in a range of ±30 A from the average pore diameter occupying 60% or more of a total pore volume, particles of the platinum are loaded on the y-alumina carrier in a range of 0.1 to 1.5% by weight calculated as elemental platinum (Pt), and 70% or more of the particles of the platinum have a size of 8 to 15 A by direct observation using a transmission electron microscope.

According to this aspect, a platinum-loaded alumina catalyst including platinum particles with properly set particle diameters (platinum with a properly controlled particle distribution) is used in the dehydrogenation reaction of hydrogenated aromatics, and therefore, the dehydrogenation reaction of hydrogenated aromatics (namely, hydrogen production) can be executed stably due to improvement of the catalyst life.

In the above aspect, preferably, the combustion catalyst includes a catalyst having an identical structure as the dehydrogenation catalyst.

According to this aspect, by using, as the combustion catalyst, a relatively highly active catalyst having an identical structure as the dehydrogenation catalyst (for example, platinum-loaded alumina catalyst), heating of the heat medium can be favorably performed. Particularly, by using a platinum-loaded alumina catalyst including platinum particles having properly set particle diameters (platinum with a properly controlled particle distribution) in the catalytic combustion, heating of the heat medium can be stably executed due to improvement of the catalyst life.

In the above aspect, preferably, the combustion catalyst is packed in a fuel inlet part (28A) of the catalytic combustion tube to which the fuel is introduced and includes a first catalyst having an identical structure as the dehydrogenation catalyst and a second catalyst having a structure different from the first catalyst and packed in a part of the catalytic combustion tube downstream of the fuel inlet part.

According to this aspect, in the fuel inlet part of the catalytic combustion tube, the fuel can spontaneously ignite in a favorable manner by the first catalyst. Also, since a part of the catalytic combustion tube downstream of the fuel inlet part of is filled with the second catalyst which has a different structure from the first catalyst, it is possible to lower the catalyst cost by using, as the second catalyst, a cheaper catalyst (general-purpose catalyst) than the first catalyst.

In the above aspect, preferably, the heat medium is hot oil.

According to this aspect, it is possible to supply heat to the dehydrogenation reactor easily with an appropriate heat medium.

In the above aspect, preferably, air is supplied to the catalytic combustion tube at multiple different parts in a divided manner.

According to this aspect, the catalytic combustion reaction can be made uniform over a wide region in the catalytic combustion tube thereby to suppress occurrence of hot spots.

In the above aspect, preferably, the hydrogen station further comprises: a dispenser (15) that supplies the hydrogen purified by the PSA device to a moving body equipped with a fuel cell; a precooler (17) that cools the hydrogen supplied from the dispenser by use of a coolant; and a gas-liquid separator (31) that separates the reaction product gas into gas and liquid, wherein in the gas-liquid separator, the reaction product gas is cooled by the coolant supplied from the precooler.

According to this aspect, it is possible to cool the reaction product gas to a temperature lower than the atmospheric temperature by using the coolant of the precooler, and therefore, the aromatic compounds (for example, toluene) and unreacted raw material (for example, cyclohexane) contained in the reaction product gas can be condensed favorably in the gas-liquid separator.

In the above aspect, preferably, in the dehydrogenation reaction, hydrogen and toluene are produced by dehydrogenation of cyclohexane as the hydrogenated aromatic, the hydrogen station further comprises: a first tank (4) storing the cyclohexane; and a second tank (6) storing the toluene, and the first tank and the second tank are each disposed underground.

According to this aspect, the degree of freedom of use of the space above the ground in the hydrogen station is increased, and the hydrogen station can be made compact. In this case, an underground tank for storing gasoline or the like in an existing gas station can be used (repurposed) to store cyclohexane and/or toluene.

In the above aspect, preferably, at least one of a gas-phase gas in the first tank and a gas-phase gas in the second tank is supplied to the catalytic combustion tube as the fuel together with the purge gas discharged from the PSA device.

According to this aspect, hydrogen that may be contained in at least one of the gas phase in the first tank and the gas phase in the second tank can be removed safely.

In the above aspect, preferably, at least one of the gas-phase gas in the first tank and the gas-phase gas in the second tank is introduced, together with air, to a fuel inlet part (28A) of the catalytic combustion tube to which the fuel is introduced.

According to this aspect, hydrogen contained in at least one of the gas phase in the first tank and the gas phase in the second tank can be used as the fuel for ignition in the catalytic combustion tube.

In the above aspect, preferably, the catalytic combustion tube is a coil filled with the combustion catalyst.

According to this aspect, the heating of the heat medium by the catalytic combustion can be performed uniformly.

In the above aspect, preferably, the hydrogenated aromatic is one member or a mixture of two or more members selected from the group consisting of a hydride of monocyclic aromatic, a hydride of bicyclic aromatic, and a hydride of compound having 3 or more aromatic rings.

According to this aspect, the dehydrogenation reaction can be performed favorably by using an appropriate hydrogenated aromatic.

In the above aspect, preferably, the hydrogenated aromatic is one member or a mixture of two or more members selected from the group consisting of methylcyclohexane, cyclohexane, trimethylcyclohexane, decalin, and dibenzotriol.

According to this aspect, the dehydrogenation reaction can be performed favorably by using an appropriate hydrogenated aromatic.

One aspect of the present invention is a hydrogen producing method in a hydrogen station, comprising: producing hydrogen by dehydrogenation reaction of a hydrogenated aromatic in presence of a dehydrogenation catalyst; supplying heat to the dehydrogenation reaction via a heat medium heated by using fuel; and purifying a reaction product gas containing hydrogen produced by the dehydrogenation reaction, by using an adsorbent according to a pressure swing adsorption method, wherein a purge gas containing hydrogen is used for regeneration of the adsorbent, and in heating of the heat medium, the purge gas used for regeneration of the adsorbent is supplied as the fuel together with air.

According to this aspect, when a heated heat medium is used to input heat to the dehydrogenation reaction of hydrogenated aromatics, the heat medium is heated by catalytically combusting the purge gas that has been used in regeneration of the adsorbent according to the pressure swing adsorption method, and therefore, it is possible to avoid use of direct fire and suppress $CO_2$ emission in the heating of the heat medium.

Hydrogen attracted attention as clean secondary energy from 1970s, and in Japan, research and development of hydrogen production technologies and fuel cells were promoted in the Sunshine Project from 1974 to 1992, the Moonlight Project from 1978 to 1992, and the New Sunshine Project from 1993 to 2001. Regarding large-scale storage and transportation technology of hydrogen, development of liquefied hydrogen method was started in the WE-NET project from 1992 to 2002. On the other hand, the history of development of the organic chemical hydride method (OCH method) is old, and goes back to the Euro-Quebec project which was carried out in 1980s as an international research and development project by Canada's Quebec government and twelve European countries. This plan proposed producing hydrogen by performing water electrolysis by using excess hydroelectric power abundantly present in Quebec and transporting the hydrogen across the Atlantic Ocean for use in Europe. As a hydrogen transportation method, discussion was made on the liquid hydrogen method as a first candidate, the liquid ammonia method as a second candidate, and the OCH method as a third candidate. At that time, the organic chemical hydride method was called an MCH method. The Euro-Quebec project continued till about 1992 for approximately 10 years but the project ended with none of the methods being practically implemented, and since then, technology for large-scale hydrogen store and transport has not been practically implemented.

In Japan, development of the liquefied hydrogen method was promoted in WE-NET project implemented from 1992 to 2002, while the research of the OCH method was promoted mainly by Japanese universities. The applicant started the development of dehydrogenation catalyst in 2002 and made a first academic presentation in the World Hydrogen Energy Conference held in Yokohama in 2004, and from around this time, examples of research and development at companies were started to be released. At the present time, the large-scale hydrogen storage and transportation technologies for which research and development have been advanced to a demonstration level are only the liquefied hydrogen method and the OCH method, which is proposed by the applicant.

The OCH method is a method in which hydrogen is subjected to hydrogenation reaction with an aromatic such as toluene (TOL) and converted to a saturated cyclic compound such as methylcyclohexane (MCH) having the hydrogen taken in the molecule thereof so that "storage" and "transportation" are achieved in a liquid state under normal temperature and normal pressure and a necessary amount of hydrogen is taken out by dehydrogenation reaction and used at the place of use. Thus, the method includes a hydrogenation reaction (hydrogen storage reaction) for making hydrogen react with TOL and a dehydrogenation reaction (hydrogen generation reaction) for generating hydrogen from MCH and recovering TOL. TOL generated after taking out hydrogen is recovered and repeatedly used as a container (carrier) of hydrogen.

Since hydrogen is an explosive gas, there is a potentially high risk in storing and transporting hydrogen as it is in a large scale. In the OCH method, storage and transportation of hydrogen are performed with the hydrogen being retained in the molecule of MCH, which is a component of gasoline and diesel oil and is in the liquid state under normal temperature and normal pressure, and therefore, this method is highly safe in principle. Specifically, even if the tank and the reactor of the system according to the OCH method are caught in a fire, it would be similar to conventional oil refinery fires, and it is considered that the possibility of causing severe damage to the surrounding urban area is very low. The thought "accidents will eventually happen" is very important to safety measures, and that is why it is required to be safe in principle.

With the OCH method, it is possible to store about 530 L of hydrogen gas in 1 L of liquid MCH. To physically decrease the volume of hydrogen gas to 1/500 or less, it is necessary to compress the hydrogen gas to 500 atm or higher or to cool the hydrogen gas to −253° C. or lower to make it liquid hydrogen which is 1/800 in volume, but according to the OCH method, by use of chemical reaction, it is possible to decrease the volume to 1/500 under normal temperature and normal pressure. Also, since TOL and MCH are in the liquid state in a wide temperature range of −95 to 101° C., they can be handled as a liquid such as water under any environment on the Earth. To establish a large-scale supply chain, it is necessary to procure hundreds of thousands of tons of TOL, but TOL is a fuel base material contained in high octane gasoline in a proportion of 10% by weight or more and also is a general purpose chemical product produced in 20 million tons per year worldwide in addition to being used widely as industrial solvent. Therefore, TOL can be easily procured in large amounts.

From the foregoing, the primary feature of the present method is that it can lower the potential risk regarding large-scale storage and transportation of hydrogen to the level of the risk related to conventional gasoline storage and transportation in principle (namely, it is a highly safe method), and this is the first reason why the applicant focused on the OCH method. Also, storage of TOL and MCH in large tanks and transportation of the same by chemical tankers and chemical lorries have been practically implemented from old times as chemical products. In the current trend of electrification of automobiles, demand for gasoline, diesel oil, etc. as automobile fuels is expected to decrease and it is a significant merit that the existing infrastructure therefor, such as storage tanks, can be diverted in the OCH method.

Further, in a case where hydrogen is used in large scale as fuel for power generation in the future, it is expected that hydrogen fuel reserve will become necessary as the current oil reserve. TOL and MCH do not chemically change even if stored for a long period and in large scale, and there is no extra energy consumption or loss due to long-term storage, and therefore, by storing MCH in the tanks of current oil reserve base, it is possible to convert the oil reserve base to a reserve base for hydrogen energy.

The applicant focused on the OCH method which has the highest safety and is advantageous in cost because the existing infrastructure can be diverted, started the development of novel dehydrogenation catalyst, which is the key to practical implementation, in 2002, and succeeded first in the world in developing novel dehydrogenation catalyst that can be industrially applicable to the OCH method. Thereafter, for the purpose of establishment of technology for the whole system, the applicant used the developed catalyst in the dehydrogenation process and combined it with the TOL hydrogenation process, which realizes hydrogen storage reaction, to construct a demonstration plant which continuously repeats the hydrogen storage and hydrogen generation at the same place in 2013. The demonstration operation was conducted from April 2013 to November 2014 for about 10,000 hours in total, and it was confirmed that high performance as designed could be maintained stably, whereby the establishment of the technology was completed.

Thereafter, as the final stage of the development, a first-in-the-world demonstration of international hydrogen supply chain, in which about 200 tons of hydrogen was actually transported from Brunei in Southeast Asia to Kawasaki waterfront in Japan by use of the system according to the OCH method, was carried out as a project of NEDO (New Energy and Industrial Technology Development Organization) in 2020, and the demonstration of transporting 100 tons or more of hydrogen per year using the present system has been completed.

JP4652695B2 (hereinafter referred to as Patent Document 3) and JP4142733B2 (hereinafter referred to as Patent Document 4) disclose dehydrogenation catalysts that can be used in the dehydrogenation reaction of the OCH method mentioned above. Regarding the dehydrogenation in this method, several concrete methods are proposed in the world, but in order to put facilities for supplying fuel for power generation into practical use in large scale, not only a high yield but also a sufficient catalyst life is required. Therefore, in the hydrogen station and the hydrogen producing method using the OCH method regarding the present invention also, it is preferred to use such a dehydrogenation catalyst that has a long life and is economically excellent.

Patent Document 3 discloses a platinum-loaded alumina catalyst in which platinum is loaded on a porous γ-alumina carrier having a surface area of 150 $m^2/g$ or more, a pore volume of 0.55 $cm^3/g$ or more, and an average pore diameter of 90 to 300 Å, with pores having a pore diameter of 90 to 300 Å occupying 60% of a total pore volume. Also, Patent Document 4 discloses a uniform-type platinum-loaded alumina catalyst in which sulfur is contained in the alumina carrier so that the dispersion mode of the loaded platinum becomes uniform-type and the decomposition reaction is suppressed to improve the catalyst life. Note that the disclosure of the all documents, referred to in this specification, including Patent Documents 3 and 4, constitutes a part of the present specification, and detailed description thereof is omitted.

Here, the dehydrogenation catalysts disclosed in Patent Document 3 and Patent Document 4 are characterized in that the particle diameter of the platinum particles loaded on the alumina carrier is remarkably small compared to the conventional platinum catalyst. An average particle diameter of the platinum particles of a general platinum-loaded alumina catalyst is 20 Å or greater. In the past, the OCH method could not be put into practice because the dehydrogenation catalyst has not been developed, but the applicant found that the catalytic activity of the platinum-loaded alumina catalyst is remarkably improved by highly dispersing the platinum particles as small particles of about 10 Å, whereby the applicant established the technology of the present method and completed a first-in-the-world demonstration of international hydrogen supply chain according to the present method by the end of 2020.

The platinum particle diameters of the dehydrogenation catalysts disclosed in Patent Document 3 and Patent Document 4 are 10 Å or less, and most of the platinum particle diameters is 20 Å or less. As mentioned above, the minimum value of the platinum particle diameters of the existing platinum-loaded alumina catalyst is about 20 Å and the average particle diameter is 20 Å or greater. In the hydrogen station according to the present invention based on the OCH method, it is preferred to use dehydrogenation catalysts in which the average particle diameter of the platinum particles is 20 Å or less, including the dehydrogenation catalysts disclosed in Patent Document 3 and Patent Document 4.

Regarding the catalyst that can be used as a dehydrogenation catalyst in the present invention, the uniform-type catalyst is effective when the raw material is sufficiently diffused to the inside of the catalyst, and the egg shell-type catalyst is effective when the diffusion to the inside of the catalyst is limited and is not performed sufficiently, and therefore, it is possible to use these two types of catalysts properly depending on the state of diffusion in the reaction field. Also, even with the same reaction, the state of diffusion of the raw material to the inside of the catalyst may differ depending on the position in the dehydrogenation reactor, and near the exit where the reaction has progressed, the raw material concentration becomes low, and the diffusion to the inside of the catalyst may be limited. In such a case, it is possible to use both of uniform-type and egg shell-type catalysts in the reactor.

In general, the extent of diffusion of the raw material to the inside of the catalyst is represented by a catalyst effectiveness factor, and the catalyst effectiveness factor can be controlled by changing the size and shape of the catalyst pellet. Thus, for both of the uniform-type and egg shell-type catalysts, it is possible to produce platinum-alumina catalysts having various catalyst effectiveness factors by changing the size and shape of the catalyst pellet.

In the platinum-loaded alumina catalyst that can be used as a dehydrogenation catalyst in the present invention, it is preferred that the alumina carrier on which platinum is loaded has pore sizes controlled as uniformly as possible so that the pore distribution thereof is sharp. Specifically, a γ-alumina carrier having a surface area of 200 $m^2/g$ or more, a pore volume of 0.5 $cm^3/g$ or more, and an average pore diameter of 60 to 150 A, with pores having a pore diameter in a range of ±30A from the average pore diameter occupying 60% or more of a total pore volume is preferred. If the surface area is less than 200 $m^2/g$, the activity after the catalyst is formed is not sufficient, and if the pore volume is less than 0.5 $cm^3/g$, uniform loading of the active metal component is difficult, if the average pore diameter is less than 60 A, the pore volume becomes small while the surface area becomes large, and if, to the contrary, the average pore diameter is larger than 150 A, the surface area becomes small while the pore volume becomes large. When these correlations are taken into consideration comprehensively, an average pore diameter of 60 to 150 A is appropriate. Also, if the pores having a pore diameter in a range ±30 A from the average pore diameter occupy less than 60%, the effect of the present invention in the catalyst performance becomes less. As a result of that the pore sizes are made uniform as this, the alumina carrier has a uniform pore size over the entirety of the powder and molded body thereof. As a result, it is possible to properly execute a process of dispersing and loading platinum on the alumina carrier and a process of dispersing and loading platinum over the entirety in correspondence with the distribution of sulfur.

The hydrogen station according to the present invention includes a dehydrogenation reactor that produces hydrogen by dehydrogenation reaction of hydrogenated aromatics (for example, methylcyclohexane) serving as hydrogen carriers, and a PSA device according to the PSA (Pressure Swing Adsorption) method for purifying the produced hydrogen until the purity reaches a purity that can be supplied to a fuel cell vehicle (FCV) or the like. Also, in the hydrogen station, a system for recovering TOL produced by the dehydrogenation reaction and unreacted MCH may be installed.

As the dehydrogenation reactor in the present invention, a multi-tube fixed-bed reactor having a structure similar to a heat exchanger is suitable. Namely, in the dehydrogenation reactor, catalytic reaction tubes filled with the dehydrogenation catalyst are arranged in the reactor in parallel, and MCH gas heated to the reaction temperature is supplied to these catalytic reaction tubes while a liquid heat medium is supplied to the outside of the catalytic reaction tubes, whereby the heat necessary for the endothermic reaction of the dehydrogenation reaction is supplied and the reaction temperature is maintained.

In the present invention, as the heat medium for supplying heat to the catalytic reaction tubes, a liquid with a large heat capacity is preferred. When a gas is used as the heat medium, there is a drawback that since the heat capacity is small, the heat transfer area needs to be large and this requires the outer surface area of the catalytic reaction tubes to be increased, making the reactor larger than necessary. As the liquid heat medium, existing molten salt or hot oil can be used. Note, however, that the molten salt often contains oxygen atom in the molecule, and if, in an unlikely event such as unexpected earthquake or the like, the MCH gas in the reaction tubes comes into contact with the molten salt, there is a possibility of catching fire even in the reaction temperature region of 300 to 400° C. Therefore, it is highly safe and preferred to use hot oil, which never catches fire, as the heat medium because it will not lead to fire in principle.

In the present invention, a commercially available general oil for heat medium may be used as the hot oil. Since the hot oil is a hydrocarbon having a large molecular weight, the hot oil may be thermally decomposed at about 400° C. and a loss may occur. Therefore, it is preferred that a hot oil capable of minimizing the thermal decomposition loss is used as the hot oil for supplying heat to the catalytic reaction tubes.

In the present invention, the hot oil may be stored in a storage tank equipped with catalytic combustion tubes (catalytic combustion coils) filled with a combustion catalyst so that the hot oil can be heated by transferring heat generated by catalytic combustion from the catalytic combustion tubes to the hot oil. Since the hot oil is not corrosive, cheap steel may be used as the metal material forming the catalytic combustion tubes.

In the present invention, an existing combustion catalyst known as a catalyst used in catalytic combustion may be used as the combustion catalyst packed in the catalytic combustion tubes. Note, however, that since the combustion catalyst needs to be capable of reliably making the fuel spontaneously ignite and it is required to cause spontaneous ignition below the water freezing point at hydrogen stations in cold regions, it is preferred to use a highly active platinum catalyst as the combustion catalyst. On the other hand, in the present invention, the dehydrogenation catalyst that may be used in the dehydrogenation reactor is very highly active and can lower the dehydrogenation temperature required by the existing dehydrogenation catalyst by 100° C. or more. Therefore, in the present invention, the catalyst that may be used as the dehydrogenation catalyst is used, in addition to the existing combustion catalyst, as a combustion catalyst of higher performance, whereby the fuel can spontaneously ignite in a reliable manner. Also, it is considered that if the catalyst used as the dehydrogenation catalyst is used as the whole combustion catalyst, it is possible to make the fuel spontaneously ignite in any cold region on the earth.

In the present invention, the catalysts that may be used as the dehydrogenation catalyst and the combustion catalyst include, in addition to the platinum-loaded alumina catalyst disclosed in the above-described Patent Document 3 and Patent Document 4, a novel platinum-loaded alumina catalyst in which the particle diameter of the platinum particles loaded on the carrier is set more properly (platinum particle distribution is controlled properly) by direct observation using a transmission electron microscope, as described below.

In the present invention, existing combustion catalysts that can be used as the combustion catalyst (later-described second catalyst) include a combustion catalyst having at least one of noble metals such as platinum, palladium, iridium, etc. loaded on the carrier, and a metal-loaded catalyst having at least one of metals such as nickel, cobalt, molybdenum, chrome, vanadium, molybdenum, etc. loaded on the carrier. Noble metals are expensive but highly ignitable, while non-noble metals are less ignitable but have an advantage of low cost.

In the present invention, the PSA device has multiple columns (adsorption tank) filled with an adsorbent, and the reaction product gas is supplied to these columns so that the impurities are adsorbed and removed. In the PSA device, the reaction product gas is supplied to one of two columns, for example, so that impurities are adsorbed by the adsorbent and hydrogen gas is taken out. The adsorption capacity of the adsorbent decreases with the passage of time, and therefore, the supply destination of the reaction product gas is switched to the other column at an appropriate timing. Regeneration of the adsorbent is performed by lowering the pressure in the columns to desorb the adsorbed impurities, and supplying the product hydrogen gas not including impurities to purge the impurities. The PSA method changes the pressure to desorb impurities and thus is called a pressure swing adsorption method. The purge gas used in the regeneration operation of the PSA device uses the product hydrogen and therefore contains a high concentration of hydrogen after the removal of impurities.

In the present invention, the purge gas discharged from the PSA device (namely, after purging the impurities) may be used as the fuel supplied to the catalytic combustion coil. The purge gas of the PSA device is supplied from the column in the regeneration mode (the adsorbent is being regenerated) of the multiple columns. Here, it is preferred that the column to be regenerated in the PSA device is sequentially switched so that the purge gas as the fuel is continuously supplied (discharged) without interruption and hence the regeneration process is executed without interruption. Note, however, that a hydrogen holder for storing pressurized purge gas may be provided as necessary. For example, by supplying the whole purge gas discharged from the PSA device to the hydrogen holder so that the purge gas is temporarily stored therein, the purge gas can be stably supplied from the hydrogen holder to the catalytic combustion coil, and in addition, the whole amount of purge gas discharged from the PSA device can be used without waste.

In the present invention, as a system for recovering the TOL produced by the dehydrogenation reaction and the unreacted MCH, a gas-liquid separator may be provided between the dehydrogenation reactor and the PSA device. In the gas-liquid separator, the reaction product gas taken out from the dehydrogenation reactor is cooled to 100° C. or lower, whereby liquid phase components (including TOL, MCH, etc. condensed to liquid) can be recovered. Further, in the gas-liquid separator according to the present invention, it is preferred to cool the reaction product gas to 10° C. or lower to improve the recovery rate of TOL, MCH, etc.

Recovering TOL, MCH, etc. as much as possible from the reaction product gas before being introduced to the PSA device as described above not only decreases the toluene loss converted as an unrecovered amount but also contributes to the reduction of processing load of the PSA device. Also, since an increase of the amount of impurities removed by adsorption in the PSA device can lead to an increase of the amount of $CO_2$ emission produced at the time of catalytic combustion, the recovery of TOL, MCH, etc. has an effect of reducing this.

When the reaction product gas containing TOL and MCH is cooled, normally, it can be cooled to about 50° C. naturally without particular energy consumption, and when it is further cooled to about the atmospheric temperature, cooling water may be used. However, cooling of the reaction product gas to 10° C. or lower is difficult particularly in summer season or the like when the temperature is high, and therefore, new cold therefor is necessary. In the hydrogen station, it is possible to pump 5 kg of hydrogen into the hydrogen tank of an FCV within 3 minutes, but to prevent the temperature of the FCV hydrogen tank from increasing to 80° C. or higher due to the frictional heat generated at this time, hydrogen is cooled beforehand to about −40° C. by a precooler. Thus, in the present invention, it is possible to cool the reaction product gas containing TOL and MCH by using the cold of the precooler.

In the hydrogen station where the dehydrogenation reaction is performed, a tank for storing MCH as the raw material for the dehydrogenation reaction and TOL produced in the dehydrogenation reaction is necessary. In existing gas stations, underground tanks for gasoline, kerosene, fuel oil, etc. are provided. MCH and TOL are classified in Class 4 dangerous goods, Class 1 petroleum, and thus are classified as dangerous goods like gasoline and kerosene. Also, MCH and TOL are compounds whose number of carbon atoms is 7, and compared to gasoline which contains hydrocarbon components whose number of carbon atoms is 4 or more, the vapor pressure is low and volatilization is small.

On the other hand, MCH and TOL stored in the hydrogen station contain hydrogen gas according to the solubility, but the quantity thereof is minute and it is normally improbable that the concentration equal to or higher than the explosive limit is reached in the gas phase components in the underground tank. However, it is preferred to provide a system for removing dissolved hydrogen from the underground tank.

To remove the dissolved hydrogen, in the present invention, the gas (tank gas) obtained by exhausting gas phase components in the tank storing MCH (MCH tank) and the gas phase components in the tank storing TOL (TOL tank) can be catalytically combusted. In this case, since the tank gas contains not only hydrogen but also MCH and TOL, whose release into the atmosphere is not desirable, in amounts corresponding to the vapor pressures, there is an advantage that they also can be processed by catalytic combustion. Note that, if cost increase is acceptable, it may be conceived to bubble inert gas such as nitrogen into the liquid in these tanks to discharge the gas phase components.

Air may be used as oxygen necessary for the catalytic combustion of the tank gas. Also, separately from the purge gas discharged from the PSA device, catalytic combustion of the tank gas may be performed by using a similar catalytic combustion coil. Note, however, that if the tank gas is mixed into the purge gas and catalytically combusted, there is an advantage that the hydrogen in the tank can be processed with a simple configuration. The tank gas is introduced to the inlet part of the catalytic combustion coil filled with the platinum-loaded alumina catalyst together with air, whereby the tank gas can be catalytically combusted by spontaneous ignition.

The hydrogenated aromatic that can be used in the dehydrogenation reaction according to the present invention is not limited to MCH, and may preferably be one member or a mixture of two or more members selected from the group consisting of a hydride of monocyclic aromatic such as cyclohexane, dimethylcyclohexane, trimethylcyclohexane, etc., a hydride of bicyclic aromatic such as tetralin, decalin, methyldecalin, biphenyl, diphenylmethyl, etc., and a hydride of compound having 3 or more aromatic rings such as dibenzotriol, tetradecahydroanthracene, etc.

Effect of the Invention

According to the foregoing configuration, when a heated heat medium is used to input heat to the dehydrogenation reaction of hydrogenated aromatics in the hydrogen station and the hydrogen producing method, it is possible to avoid use of direct fire and suppress $CO_2$ emission in the heating of the heat medium.

MODE(S) FOR CARRYING OUT THE INVENTION

In the following, with reference to the drawings, a hydrogen station and a hydrogen producing method according to an embodiment will be described.

Existing hydrogen stations are roughly classified into an on-site type and an off-site type. The on-site type is a generic term for hydrogen stations that produce hydrogen in the hydrogen station. The off-site type is a generic term for hydrogen stations to which high-purity hydrogen is directly transported as compressed hydrogen or liquid hydrogen and which uses the hydrogen stored therein after boosting. The hydrogen station according to the present invention, which will be described in detail later, produces hydrogen by on-site dehydrogenation reaction, and is similar to on-site reforming-type hydrogen stations, and therefore, it is expected to be classified as the on-site type. However, at the current point of time, the hydrogen station according to the present invention is in a research and development stage, and there is no actual one, and therefore, it is uncertain which it will be finally classified into.

(Conventional Technology)

Figure 1:
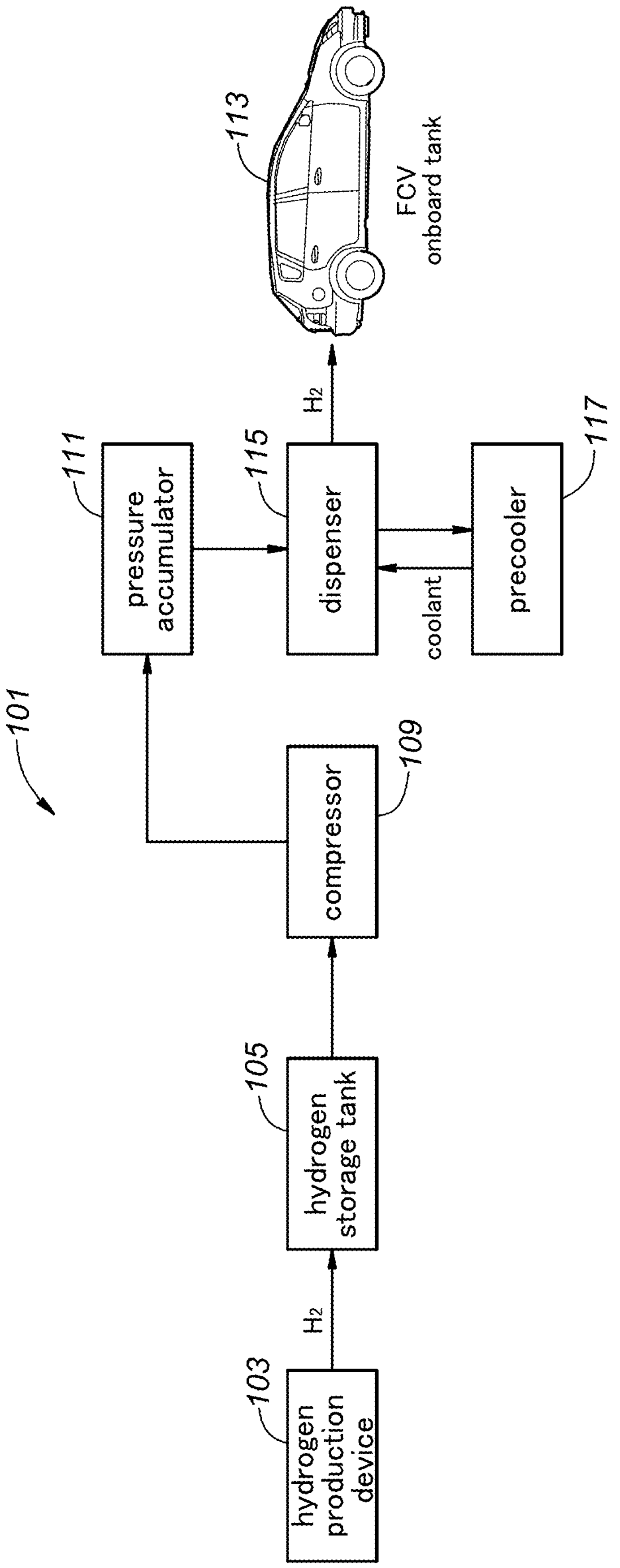
FIG. 1 is a configuration diagram of a conventional hydrogen station.

As shown in FIG. 1, a conventional on-site type hydrogen station 101 includes a hydrogen production device 103 necessary for hydrogen production. As the hydrogen production device 103, a water electrolysis device or a reforming-type hydrogen production device is used. In the reforming-type hydrogen production device, fossil fuel such as city gas is steam-reformed and thereafter is converted to hydrogen and carbon dioxide by shift reaction. The water electrolysis device uses electric power for electrolysis of water and therefore has a cost problem, and the reforming-type hydrogen production device produces carbon dioxide, and thus, they are not mainstream as hydrogen stations actually operating as commercial stations. Currently, the situation is that, off-site type hydrogen stations according to the compressed hydrogen method or the liquid hydrogen method are operating as commercial stations at about 50 locations for each method.

The hydrogen produced by the hydrogen production device 103 is sent to a hydrogen storage tank 105 and is temporarily stored there. Thereafter, the hydrogen stored in the hydrogen storage tank 105 is sent to a compressor 109, and after the pressure is raised to about 800 atm there, is sent to a pressure accumulator 111 to be stored there as product hydrogen.

The product hydrogen stored in the pressure accumulator 111 is supplied via a dispenser 115 to a fuel cell vehicle (FCV) 113 that uses the hydrogen station 101.

Pumping of hydrogen into the onboard tank of the FCV 113 is required to pump 5 kg of hydrogen in 3 minutes, for example, and due to the frictional heat generated when pumping hydrogen at this rate, the temperature in the onboard tank of the FCV 113 increases. Therefore, to keep the temperature in the onboard tank at or below 80° C., the hydrogen supplied from the dispenser 115 is sent to the FCV 113 in a state cooled to about −40° C. by the coolant supplied from a precooler 117.

First Embodiment

Next, with reference to FIGS. 2 and 3, a hydrogen station 1 according to the first embodiment of the present invention and a hydrogen producing method thereof will be described.

Figure 2:
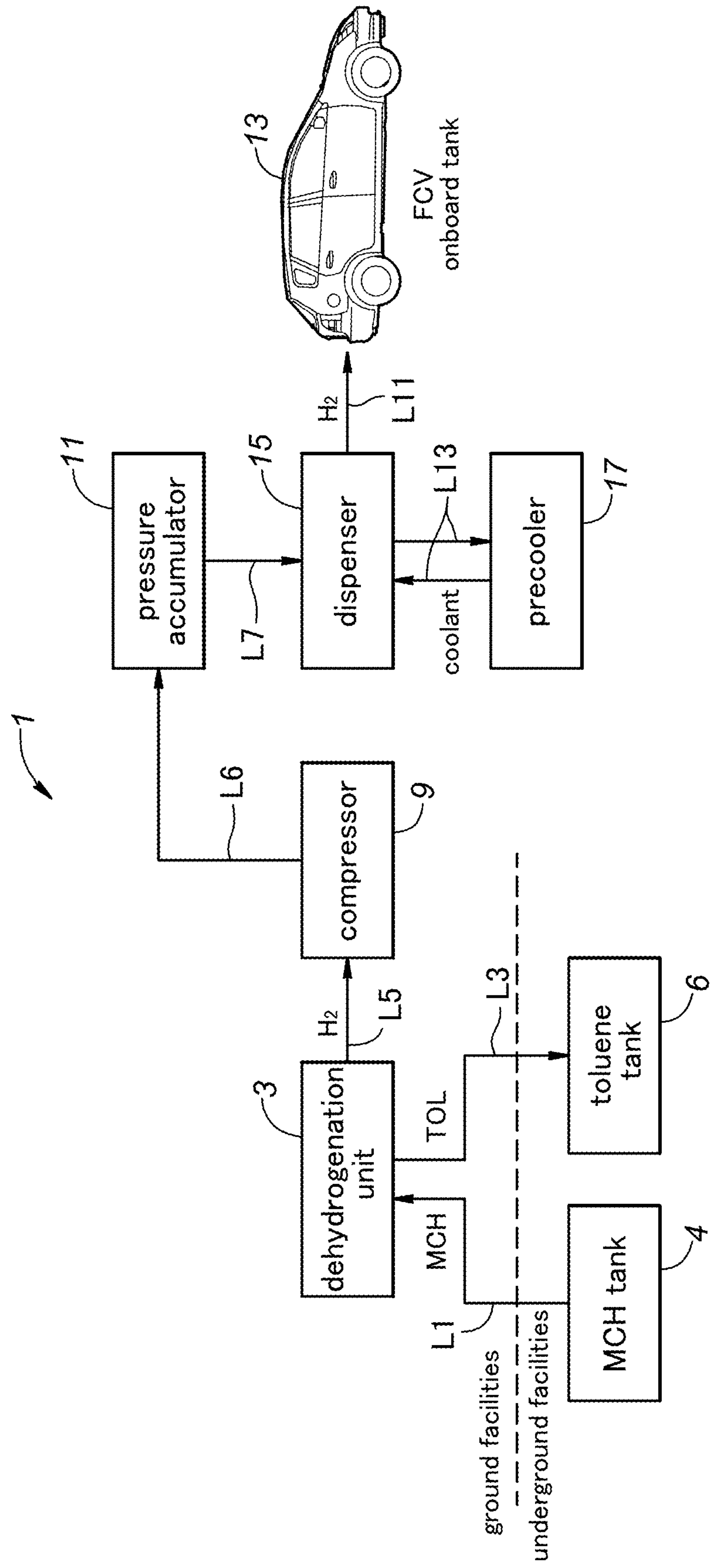
FIG. 2 is a configuration diagram of a hydrogen station according to a first embodiment.
Figure 3:
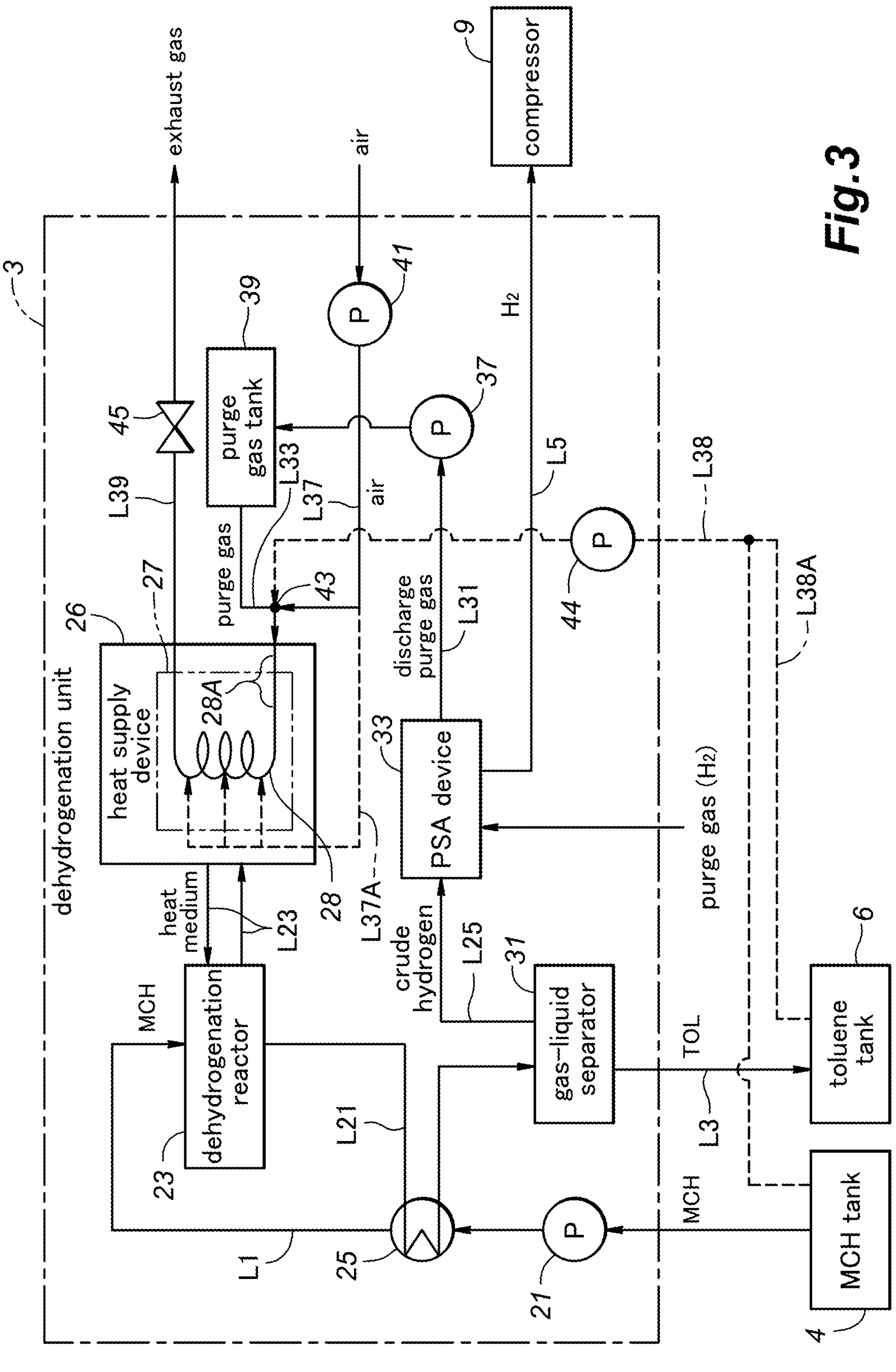
FIG. 3 is a diagram showing a detailed configuration of a dehydrogenation unit according to the first embodiment.

As shown in FIG. 2, the hydrogen station 1 according to the first embodiment includes a dehydrogenation unit 3 that produces hydrogen by dehydrogenation reaction of hydrogenated aromatics. As described in detail later, in the dehydrogenation unit 3, methylcyclohexane (MCH) is used as a hydrogenated aromatic serving as raw material, and due to dehydrogenation reaction of MCH in presence of a dehydrogenation catalyst, a reaction product gas (reaction product) containing hydrogen, toluene (TOL), etc. is produced. This reaction product gas contains unreacted MCH and the like.

MCH is stored in an MCH tank 4 and is supplied to the dehydrogenation unit 3 via a raw material supply line L1. TOL is sent from the dehydrogenation unit 3 to a toluene tank 6 via a toluene discharge line L3 and is stored there. The supply of MCH to the MCH tank 4 and recovery of TOL from the toluene tank 6 are executed by chemical lorries not shown in the drawings.

The MCH tank 4 and the toluene tank 6 each may be disposed in an appropriate position in the hydrogen station 1, and are preferably disposed underground in the hydrogen station 1. Thereby, the degree of freedom of use of the space of the hydrogen station 1 above the ground is increased, and also, the hydrogen station 1 can be made compact. In this case, underground tanks for storing gasoline or the like in an existing gas station can be used to store MCH and TOL (namely, repurposed as the MCH tank 4 and the toluene tank 6).

The hydrogen produced by the dehydrogenation unit 3 is sent to a compressor 9 via a hydrogen transportation line L5. The hydrogen sent to the compressor 9 is purified in the dehydrogenation unit 3 to a degree usable as product hydrogen.

Similarly to the conventional hydrogen station 101 shown in FIG. 1, after the pressure is raised to about 800 atm in the compressor 9, the hydrogen is sent to a pressure accumulator 11 via a hydrogen transportation line L6. The hydrogen sent to the pressure accumulator 11 is stored there as product hydrogen. The product hydrogen stored in the pressure accumulator 11 is sent to a dispenser 15 via a hydrogen transportation line L7, and from there, is supplied to the fuel cell vehicle (FCV) 13 via a filling hose L11. The hydrogen supplied from the dispenser 15 is sent to the FCV 13 in a state cooled to about −40° C. by the coolant supplied from a precooler 17. Note that the hydrogen station 1 may be used not only by the FCV 13 but also by any moving body equipped with a fuel cell.

The coolant used to cool hydrogen circulates in a first coolant circulation line L13 provided between the dispenser 15 and the precooler 17, and exchanges heat with hydrogen in a heat exchanger for hydrogen cooling provided in the dispenser 15. Alternatively, configuration may be made such that hydrogen from the dispenser 15 is sent to the FCV 13 after passing a heat exchanger for hydrogen cooling provided in the precooler 17 (namely, after exchanging heat with the coolant).

Next, with reference to FIG. 3, detailed configuration of the dehydrogenation unit 3 will be described.

In the dehydrogenation unit 3, the MCH stored in the MCH tank 4 as the raw material is supplied to a dehydrogenation reactor 23 by a liquid pump (pump for MCH transportation) 21 provided in the raw material supply line L1. In the raw material supply line L1, a heat exchanger 25 for exchanging heat between the MCH sent to the dehydrogenation unit 3 and the reaction product gas taken out from the dehydrogenation reactor 23 is provided. More specifically, the MCH flowing in the raw material supply line L1 is heated to about the reaction temperature of the dehydrogenation reaction by heat exchange at the heat exchanger 25 with the reaction product gas flowing in the reaction product gas line L21 and is introduced to an upper portion of the dehydrogenation reactor 23 in a gas state.

The hydrogen station 1 is provided with a heat supply device 26 that supplies heat to the dehydrogenation reactor 23 via heat medium heated by using the fuel. The heat supply device 26 includes a storage tank 27 that stores the heat medium and a catalytic combustion coil 28 (catalytic combustion tube) disposed in the storage tank 27 and filled with a combustion catalyst. In the catalytic combustion coil 28, the fuel is catalytically combusted in the presence of the combustion catalyst and the heat produced thereby is transmitted from the catalytic combustion coil 28 to the heat medium in the storage tank 27, whereby the heat medium is heated. The heated heat medium circulates in a heat medium circulation line L23 provided between the dehydrogenation reactor 23 and the heat supply device 26. Thereby, heat is supplied from the heat supply device 26 to the dehydrogenation reactor 23. As described in detail later, in the heat supply device 26, the purge gas discharged from a PSA device 33 (hereinafter referred to as the discharge purge gas) is used as the fuel.

The reaction product gas taken out from the dehydrogenation reactor 23 flows in the reaction product gas line L21 and is introduced to a gas-liquid separator 31 after exchanging heat with MCH at the heat exchanger 25.

The gas-liquid separator 31 has a known structure and cools the reaction product gas to separate it into a gas phase component and a liquid phase component. In the present embodiment, the reaction product gas introduced to the gas-liquid separator 31 is naturally cooled to a temperature of 100° C. or lower. In the gas-liquid separator 31, TOL and MCH contained in the reaction product gas are condensed to liquid and thereby constitute the liquid phase component. The liquid phase component is drawn out from a lower portion of the gas-liquid separator 31 and is introduced to the toluene tank 6 via the toluene discharge line L3 to be stored there.

On the other hand, hydrogen constituting the gas phase component in the gas-liquid separator 31 is crude hydrogen which contains TOL and MCH in amounts corresponding to the vapor pressures depending on the temperature. This crude hydrogen is drawn out from an upper portion of the gas-liquid separator 31 and is sent to a PSA device 33 via a crude hydrogen transportation line L25.

The PSA device 33 is a device for purifying the crude hydrogen (the gas phase component of the reaction product gas) supplied from the gas-liquid separator 31. The PSA device 33 removes impurities contained in the crude hydrogen by supplying the crude hydrogen to columns (adsorption tank) filled with an adsorbent to make the impurities adsorbed thereon according to the PSA (Pressure Swing Adsorption) method. The PSA device 33 includes multiple columns arranged in parallel and alternately switches columns for regeneration process and columns for purification process of the multiple columns thereby to continuously perform the purification.

In the columns for purification process to which the reaction product gas is supplied, impurities are adsorbed on the adsorbent in a high pressure state so that the impurities are removed. On the other hand, in the columns for regeneration process, the pressure in the columns is lowered to desorb the adsorbed impurities and high purity hydrogen is supplied as a purge gas to purge the desorbed impurities. The product hydrogen is used as the purge gas used in the regeneration operation of the columns for regeneration process. The purge gas discharged from the PSA device 33 after the removal of impurities (hereinafter referred to as the discharge purge gas) contains the impurities desorbed from the adsorbent, but the hydrogen concentration is remarkably high compared to the impurity concentration. The discharge purge gas has a hydrogen concentration of 80% or higher, for example.

Note, however, that the hydrogen concentration of the discharge purge gas is adjustable by changing the design of columns of the PSA device 33. Namely, if the columns (namely, the adsorbent amount) are enlarged and the purification process time is increased, an amount of impurities removed by adsorption increases, and therefore, the hydrogen concentration in the purge gas is lowered. On the other hand, if the columns are designed to be small in size and the switching time (purification process time) is shortened, the hydrogen concentration in the purge gas becomes high because the amount of impurities removed by adsorption is small.

Here, the amount of heat of hydrogen per weight is 120 MJ/kg which is very high but hydrogen has a small molecular weight and is light, and thus, converted to per volume, hydrogen is a substance having a low amount of heat which is 12 $MJ/Nm^3$. On the other hand, hydrocarbons such as gasoline, kerosene, and the like contain the combustion heat of carbon, and accordingly, the amount of heat per weight is about 40 MJ/kg which is about ⅓ of that of hydrogen. Regarding TOL also, the ratio between hydrogen atoms and carbon atoms does not significantly differ, and thus, its combustion heat (39.5 MJ/kg) is substantially the same as those of gasoline, kerosene, etc.

Since the impurities in the discharge purge gas are mainly TOL, assuming that the hydrogen concentration in the discharge purge gas is 80% and the remaining 20% is TOL, 1 $Nm^3$ of the discharge purge gas has an amount of heat of about 10 MJ corresponding to hydrogen and about 80 MJ corresponding to TOL. Accordingly, the discharge purge gas has an amount of heat of 90 $MJ/Nm^3$ in total. Also, assuming that the TOL concentration in the discharge purge gas is 10%, the amount of heat corresponding to TOL is about 40 MJ, and thus, the amount of heat of the discharge purge gas is 50 $MJ/Nm^3$ including the amount of heat corresponding to hydrogen.

The hydrogen contained in the discharge purge gas is the product hydrogen and thus is valuable. For example, 800 L of hydrogen gas has an amount of heat of 8.6 MJ and 200 L of TOL gas has an amount of heat of 34.6 MJ, and therefore, 1000 L of the discharge purge gas with the hydrogen concentration of 80% has an amount of heat of 43.2 MJ. On the other hand, an amount of heat necessary to produce 800 L of hydrogen by the dehydrogenation reaction is 2.6 MJ. Therefore, if the hydrogen used in the discharge purge gas is produced by the dehydrogenation reaction, the discharge purge gas can be a heat source that produces a volume of hydrogen about 17 times the volume of hydrogen contained therein.

On the other hand, in a case where the produced discharge purge gas has a hydrogen concentration of 90% and a TOL gas concentration of 10%, the total of an amount of heat of 17.3 MJ corresponding to the TOL gas and an amount of heat of 9.6 MJ corresponding to the hydrogen gas is 26.9 MJ, and thus, the amount of heat of the discharge purge gas is lowered.

Also, if the TOL concentration becomes high in the discharge purge gas for giving a necessary amount of heat, the amount of carbon dioxide discharged increases and the value of $LCACO_2$ becomes large, and hence, the significance of the hydrogen station is reduced. Therefore, it is important, in the hydrogen station 1, to design an optimal system from the viewpoints of the amount of heat of the discharge purge gas, the economic efficiency according to the hydrogen concentration, and the environmental load according to $LCACO_2$.

The discharge purge gas from the PSA device 33 is sent to a purge gas tank 39 by a purge gas pump 37 provided in a discharge purge gas line L31 and is stored there. Regarding the storage pressure in the purge gas tank 39, if the pressure is relatively low, there occurs a problem that the discharge purge gas cannot be properly supplied to the catalytic combustion coil 28 due to the pressure loss when supplied to the catalytic combustion coil 28. On the other hand, if the storage pressure in the purge gas tank 39 is relatively high, though there is an advantage that the purge gas tank 39 can be reduced in size, the required power for the purge gas pump 37 increases and this leads to a decrease in the energy efficiency of the hydrogen station 1 due to increase in the energy loss. Thus, the storage pressure in the purge gas tank 39 is decided taking into account the economic efficiency and energy efficiency together with the pressure loss and required power, and is preferably set in a range of 1 to 20 atm, more preferably, in a range of 3 to 9 atm.

The discharge purge gas is introduced to the catalytic combustion coil 28 of the heat supply device 26 as the fuel from the purge gas tank 39 via a purge gas supply line L33. Preferably, a highly active platinum-loaded alumina catalyst (hereinafter referred to as a first catalyst), which is also used as a dehydrogenation catalyst, is packed in the catalytic combustion coil 28 for ignition, together with an existing combustion catalyst (hereinafter referred to as a second catalyst). The first catalyst is packed in the fuel inlet part 28A of the catalytic combustion coil 28, and the packing amount thereof is small compared to the second catalyst. The fuel inlet part 28A (namely, the packing region of the first catalyst in the catalytic combustion coil 28) can be set over an appropriate range (length) from the upstream end of the catalytic combustion coil 28 depending on the surrounding environment of the hydrogen station 1 (particularly, atmospheric temperature) or the like. Thereby, it is possible to make the discharge purge gas spontaneously ignite in a favorable manner by the first catalyst in the fuel inlet part 28A of the catalytic combustion coil 28. Also, a part of the catalytic combustion coil 28 downstream of the fuel inlet part 28A (namely, the part other than the fuel inlet part 28A) is filled with the second catalyst having a structure different from the first catalyst, and therefore, by using, as the second catalyst, a cheaper catalyst (general-purpose catalyst) than the first catalyst, it is possible to reduce the catalyst cost. Note, however, that in the hydrogen station 1, it is not prohibited to use only the first catalyst as the combustion catalyst.

The ignition of fuel in the catalytic combustion coil 28 may be possible by providing an ignition source at about 700° C. embodied by heating of a nichrome wire in the fuel inlet part 28A, but in the hydrogen station 1, it is not preferred to use direct fire or to provide a high temperature portion of a nichrome wire in view of safety measures.

On the other hand, the first catalyst has characteristics that it has excellent ignitability and can ignite the discharge purge gas even at the room temperature. In cold regions, there is a problem that since the moisture produced in the combustion adheres to the combustion catalyst and is frozen thereon, the combustibility below the water freezing point is not good. The platinum-loaded alumina catalyst used as the dehydrogenation reaction in the present invention is estimated to have high activity which is 400 times or more higher than a typical platinum catalyst, and has a very high ignitability. By using the platinum-loaded alumina catalyst as the combustion catalyst, it is possible to make the discharge purge gas spontaneously ignite quickly in the catalytic combustion coil 28, even without provision of an ignition source such as direct fire or an electric heating wire. Particularly, by increasing the ratio of the particles having a particle diameter of 8 Å to 15 Å in the platinum particles loaded on the carrier, the dispersiveness of reaction in the first catalyst is enhanced, and even if the moisture on the combustion catalyst is frozen below the water freezing point, the surface of the platinum is prevented from completely covered with the ice, whereby it is possible to make the discharge purge gas spontaneously ignite quickly.

When the discharge purge gas is catalytically combusted, supply of oxygen is necessary. The catalytic combustion coil 28 is supplied with air containing oxygen necessary for the catalytic combustion by an air pump 41 provided in an air supply line L37. The air supply line L37 is connected to a connection part 43 of the purge gas supply line L33. Therefore, the discharge purge gas flowing in the line L33 is mixed with air in the connection part 43 and thereafter is introduced to the fuel inlet part 28A of the catalytic combustion coil 28. In this way, the mixture of the discharge purge gas and the necessary amount of air spontaneously ignites when contacting with the first catalyst packed in the fuel inlet part 28A for spontaneous ignition.

The amount of air supplied to the line L33 is only required to be more than a theoretical amount necessary for the combustion of the discharge purge gas. Note, however, that if the amount of air supplied is too much, it would impede the catalytic combustion reaction, and if the amount of air supplied is small, a problem that gas diffusion in the combustion catalyst layer may stagnate and it is difficult to maintain good combustion reaction can occur.

Also, the air necessary for the catalytic combustion in the catalytic combustion coil 28 does not necessarily have to be wholly mixed with the discharge purge gas introduced to the fuel inlet part 28A (namely, introduced to the connection part 43 of the line L33). For example, at least part of the air introduced to the connection part 43 as described above may be introduced to an intermediate part (namely, downstream side of the fuel inlet part 28A) of the catalytic combustion coil 28 via a split air supply line L37A (see the broken lines in FIG. 3). Such introduction of air to the intermediate part of the catalytic combustion coil 28 can be made to at least one or more intermediate parts.

Due to such divided supply of air to the catalytic combustion coil 28, problems such as that hot spots are formed by rapid progress of the catalytic combustion reaction near the fuel inlet part 28A so that uniform heating of the heat medium in the storage tank 27 is prevented or that a sintering phenomenon of metal particles (aggregation of active metals of the combustion catalyst) occurs due to formation of hot spots so that the surface area of the active metal decreases and the performance of the combustion catalyst is lowered.

Further, it is also possible to supply at least one of a gas constituting a gas phase component in the MCH tank 4 (hereinafter referred to as the MCH tank gas) and a gas constituting a gas phase component in the toluene tank 6 (hereinafter referred to as the toluene tank gas) to the catalytic combustion coil 28 as the fuel together with the discharge purge gas. More specifically, as shown by broken lines in FIG. 3, the MCH tank gas discharged from the MCH tank 4 is sent to the connection part 43 of the purge gas supply line L33 by a gas discharge pump 44 provided in a tank gas discharge line L38. Thereby, the MCH tank gas is mixed with the discharge purge gas in the connection part 43 at the downstream end of the tank gas discharge line L38. Similarly, the toluene tank gas discharged from the toluene tank 6 is sent to the connection part 43 of the line L33 via a branch line L38A connected to an intermediate part of the tank gas discharge line L38. Thereby, the toluene tank gas is mixed with the discharge purge gas in the connection part 43 at the downstream end of the tank gas discharge line L38. Note that the toluene tank gas may be introduced to the line L33 via a line (piping) different from that for the MCH tank gas. Also, the location where the MCH tank gas and the toluene tank gas are introduced to the line L33 is not limited to the connection part 43 and may be changed as appropriated.

The fuel catalytically combusted in the catalytic combustion coil 28 (containing the discharge purge gas) is discharged from the downstream end thereof as exhaust gas. The exhaust gas passes through an exhaust gas line L39 provided with an exhaust regulating valve 45 while maintaining a temperature of 100° C. or higher so that the moisture does not condense, and is released to the atmosphere. Since the exhaust gas is a gas after complete combustion, it has been converted to a gas containing water vapor and nitrogen as the main components and containing $CO_2$ and unreacted oxygen at low concentrations, and thus, it is a harmless gas that can be released to the atmosphere.

The product hydrogen obtained by purification of crude hydrogen at the PSA device 33 has a purity of 99.7% or higher and a carbon content of 2 ppm or less, for example. The product hydrogen is sent to the compressor 9 from the PSA device 33 via the hydrogen transportation line L5.

Second Embodiment

Figure 4:
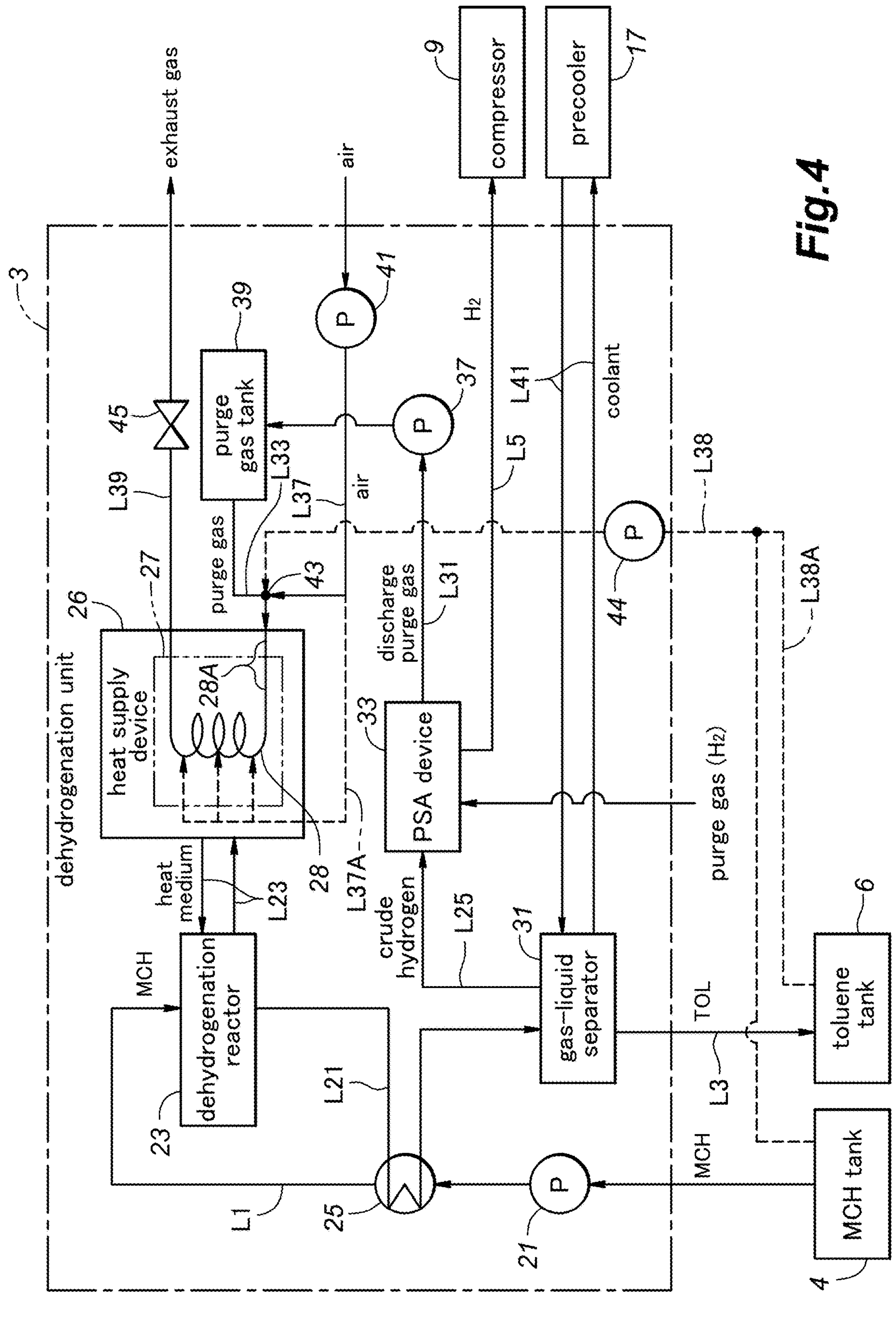
FIG. 4 is a configuration diagram of a hydrogen station according to a second embodiment.

Next, with reference to FIG. 4, a hydrogen station 1 according to the second embodiment of the present invention and a hydrogen producing method thereof will be described. In FIG. 4, components similar to those in the above-described first embodiment are denoted by the same reference numerals. Also, regarding the hydrogen station 1 according to the second embodiment, features not particularly mentioned in the following are the same as in the first embodiment. the hydrogen station 1 according to the second embodiment and the hydrogen producing method thereof are particularly suitable for improving the recovery rate of TOL contained in the reaction product gas.

As in the first embodiment, the impurities other than hydrogen contained in the reaction product gas of the dehydrogenation reaction by the dehydrogenation reactor 23 contain TOL as a main component and further contain unreacted MCH and methane gas, etc. produced by decomposition side reaction. Of these impurities, TOL and MCH can be repeatedly used as hydrogen carriers in the OCH method, and therefore, it is preferred to be capable of recovering them as much as possible within a range that can ensure economic efficiency.

As in the first embodiment, the reaction product gas flowing in the reaction product gas line L21 passes the heat exchanger 25 where it is cooled by giving heat to the raw material gas in the raw material supply line L1, and thereafter is cooled in the gas-liquid separator 31 to a temperature of 100° C. or less (for example, about 50° C.) by natural cooling. Note, however, that in hot seasons such as summer, the temperature in the gas-liquid separator 31 can exceed 60° C. The crude hydrogen constituting the gas phase component of the gas-liquid separator 31 contains TOL and MCH in amounts corresponding to the vapor pressures which depend on the temperature, and therefore, further cooling the gas-liquid separator 31 to lower the temperature of the crude hydrogen is effective to lower the concentration of TOL and MCH in the crude hydrogen sent to the PSA device 33.

Therefore, in the hydrogen station 1 according to the second embodiment, as shown in FIG. 4, the cold of the coolant of the precooler 17 is used to cool the crude hydrogen. More specifically, the coolant is caused to circulate in the second coolant circulation line L41 provided between the precooler 17 and the gas-liquid separator 31 thereby to cool the inside of the gas-liquid separator 31. In this way, the cold supplied to the dispenser 15 (see FIG. 2) and the cold supplied to the gas-liquid separator 31 are both supplied by the precooler 17, and accordingly, it is possible to cool the crude hydrogen with a simple configuration. Since the coolant supplied to the gas-liquid separator 31 has a relatively low temperature (for example, −40° C.), the supply amount thereof can be small, and the piping size of the second coolant circulation line L41 can be small so that thermal insulation can be achieved easily. The crude hydrogen in the gas-liquid separator 31 may be cooled to about −10° C. to 0° C. due to cooling by the coolant. Therefore, the concentrations of TOL and MCH which are contained in the crude hydrogen in amounts corresponding to the vapor pressures can be reduced remarkably, the processing load of the PSA device 33 can be reduced, and the loss of TOL and MCH used as hydrogen carriers can be reduced.

Note that the second coolant circulation line L41 can be provided separately from the first coolant circulation line L13. Alternatively, the first coolant circulation line L13 and the second coolant circulation line L41 may be provided to be continuous. In this case, the coolant after cooling the hydrogen in the dispenser 15 can be used for cooling in the gas-liquid separator 31.

(Dehydrogenation Catalyst)

Next, a novel dehydrogenation catalyst (platinum-loaded alumina catalyst) that can be used in the hydrogen station 1 and the hydrogen producing method according to the first and second embodiments of the present invention described above will be described. As described above, this dehydrogenation catalyst can be also used as a combustion catalyst.

Figure 5:
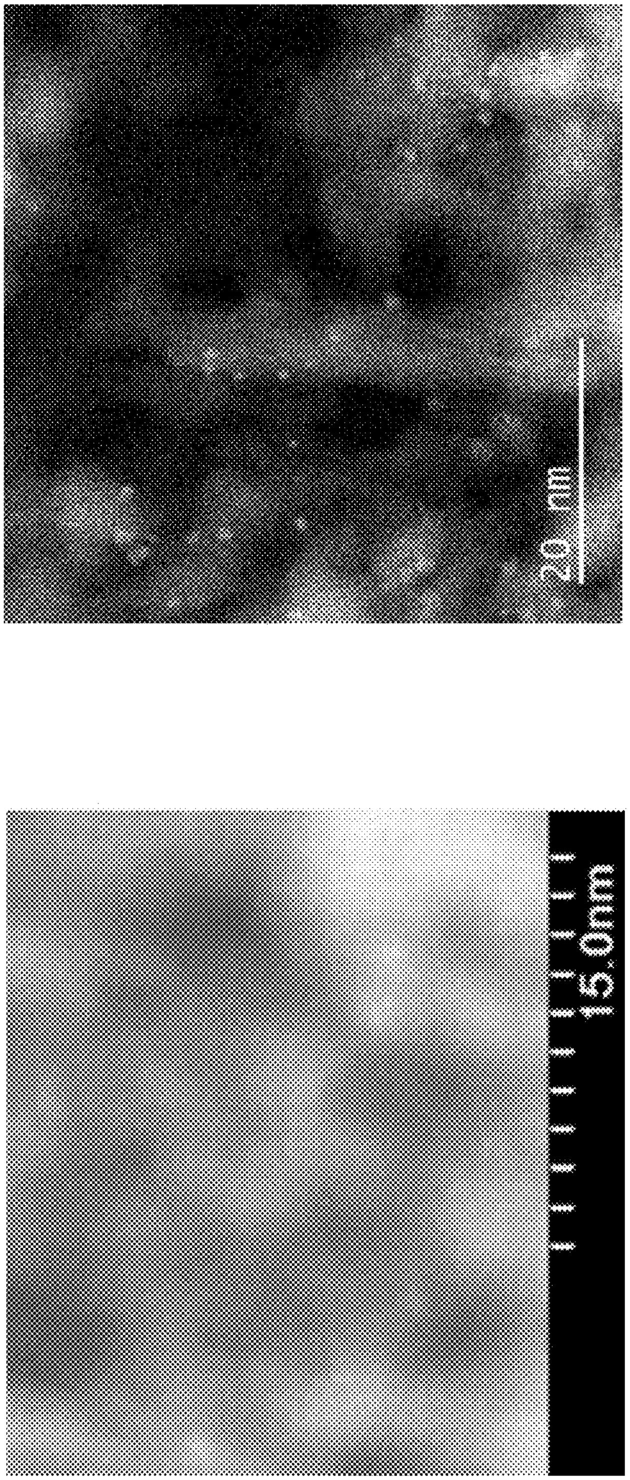
FIG. 5 is an explanatory diagram showing (A) a transmission electron micrograph in 2000s and (B) a transmission electron micrograph in recent years of a catalyst.

FIG. 5 shows photographs of catalyst taken by (A) a transmission electron microscope in 2000s and (B) a transmission electron microscope in recent years. FIG. 5(A) is a photograph of an egg shell-type catalyst disclosed in Patent Document 3. The photograph of FIG. 5(A) was taken at 1.8 million times magnification by using HITACHI, HD-200 electron microscope, which was a state-of-the-art transmission electron microscope at the time of 2006. FIG. 5(B) is a photograph of a uniform-type platinum-loaded alumina catalyst disclosed in Patent Document 4. The photograph of FIG. 5(B) was taken at 2 million times magnification by using JEOL, JEM-ARM200 electron microscope in 2018.

With the resolution of a general transmission electron microscope in 2000s, it was not possible to measure platinum particle diameters of several nanometers by direct observation, and therefore, it was common at that time to estimate the particle diameters by CO-pulse method (CO pulse adsorption method). Currently, owing to the progress of electron microscope performance, it is possible to directly observe particles of several A and molecules such as benzene rings with a resolution of about 1 Å.

In the transmission electron micrograph in 2000s shown in FIG. 5(A), it is seen that multiple platinum particles are each independently loaded but the outline of white dots (namely, platinum particles) is unclear and thus there is a tendency that the particles appear bigger than they actually are.

In the transmission electron micrograph in recent years shown in FIG. 5(B), it is seen that the outline of white dots (the platinum particles) can be observed more clearly. Therefore, the particle diameters of the platinum loaded on the alumina carrier can be measured with higher accuracy by direct observation with the transmission electron microscope in recent years. The average particle diameter of the platinum particles in the platinum-loaded alumina catalyst according to the present invention can be obtained by measuring the particle diameters of a predetermined number (typically, about 50) of platinum particles in a photograph taken by the transmission electron microscope as shown in FIG. 5(B) and calculating the average value thereof. In the transmission electron microscope, it is preferred to set the magnification such that the particle diameters of the predetermined number of platinum particles are fit in the photograph (for example, with the platinum-loaded alumina catalyst of the present invention, 40 to 50 platinum particles can be observed in the field of view at 2 million times magnification). The size of each platinum particle can be measured by aligning a measurement line with the outline of the particle on the computer screen equipped in the electron microscope system. At this time, in a case where the shape of the platinum particle has a long-axis diameter and a short-axis diameter, the long-axis diameter can be measured by aligning the measurement line with the outline of the long-axis diameter, and the short-axis diameter can be measured in a similar manner. Since there is substantially no difference between the long-axis diameter and the short-axis diameter for the platinum particles on the platinum-loaded alumina catalyst of the present invention, it is possible to use the long-axis diameter as a representative value. Also, it is also possible to measure the size of the particle diameters by printing the image and measuring the particle diameters with a ruler to compare with a scale on the image.

In contrast to this, the platinum particle diameters disclosed in the above-described Patent Document 3 and Patent Document 4 are estimated values according to the CO-pulse method. It can be considered that there is an error between the particle diameters estimated by the CO-pulse method and the particle diameters measured by direct observation using the transmission electron microscope. This is because in the CO-pulse method, the particle diameters are likely to be estimated smaller compared to the particle diameters measured by direct observation. In the CO-pulse method, since 1 molecule of CO is adsorbed on 1 atom of platinum on the platinum particle surface, a total CO adsorption amount is measured, and assuming that the shape of the platinum particle is a cube, the particle diameter is estimated as a length of one side thereof. At this time, the estimation is made with an assumption that CO is not adsorbed on the carrier. In the case of the platinum-loaded alumina catalyst, CO is preferentially adsorbed on platinum, and the injection of CO is stopped immediately when the amount of discharged CO becomes equal to the amount of injected CO, but in the alumina carrier, the surface area is large and a certain amount of CO is adsorbed on the carrier, and therefore, this CO is estimated to be adsorbed on the platinum surface.

Here, the CO-pulse method will be described. When CO is pulsatively injected into a sample, CO is adsorbed on the surface of loaded metal and the amount of discharged CO is small in the early stage of the injection. After a while, CO is adsorbed on almost the entire surface of the loaded metal, and when a steady state is reached, almost all of the injected CO is discharged. At this time, the amount of discharged CO during adsorption is subtracted from the amount of discharged CO in the steady state, and the sum of the differences is obtained as the CO adsorption amount. The CO-pulse method is a method for calculating a metal surface area, dispersion ratio, and particle diameter from the adsorption amount and the loaded metal content. A concrete calculation method is described below.

From the CO gas amount Vt adsorbed by a sample amount of catalyst W (g) at a measurement temperature, the adsorption gas amount V per g of the catalyst at 0° C. was obtained from the following equation (1).

$$V=(Vt/W)\times\{273/(273+t)\}\ \text{(ml/g-cat)} \qquad (1)$$

Here, when the percentage of metal content of the sample is defined as C (%) and the atomic weight of the loaded metal is defined as M, the number of moles R of the loaded metal per g of the sample is obtained from the equation (2).

$$R=(C/100)\times(1/M)\ \text{(mol/g-cat)} \qquad (2)$$

The number of moles K of the adsorption gas amount per g of the sample is obtained from the equation (3).

$$K=V/(22.4\times10^{-3}\times10^{6})\ \text{(mol/g-cat)} \qquad (3)$$

From these, the dispersion degree B (proportion of effective surface metal in the loaded metal) is obtained from the equation (4).

$$B=(K/R)\times100(\%) \qquad (4)$$

When the lattice constant of the loaded metal catalyst is defined as a (A), and it is assumed that one adsorption gas molecule is adsorbed to a lattice constant area $a^2$, the specific surface area S of the metal is obtained from the equation (5).

$$S=\text{the number of gas molecules adsorbed to 1 g of sample}\times a^2$$

$$=K\times6.02\times10^{23}\times(a\times10^{-10})^2 \qquad (5)$$

Further, when a loaded metal particle is assumed to be a cube with a side length D (m), five surfaces out of six surfaces of the particle are effective, and therefore, the following equations are established.

$$\text{Effective area } S \text{ of one particle}=5D^2\ (\text{m}^2) \qquad (6)$$

$$\text{Volume } v \text{ of one particle}=D^3\ (\text{m}^3) \qquad (7)$$

When the number of particles of the loaded metal per g of sample is defined as n, the following equations are established.

$$\text{Specific surface area } S \text{ of loaded metal}=ns=n5D^2\ (\text{m}^2) \qquad (8)$$

$$\text{Volume } Vc \text{ of loaded metal}=nv=Nd^3\ (\text{m}^3) \qquad (9)$$

From the equations (6) to (9), the length D (m) of one side is expressed by the equation (10).

$$S/Vc=5/D,\ \text{and therefore, } D=5\,Vc/S\ (\text{m}) \qquad (10)$$

Here, when the percentage of loaded metal content is defined as C (%) and the specific gravity is defined as d (g/cm$^3$), the volume Vc of the loaded metal per g of sample is expressed by the equation (11).

$$Vc=\text{loaded metal weight per g of sample (g/g)/specific gravity of loaded metal (g/cm}^3)$$

$$=C/100/d\ (\text{g/cm}^3) \qquad (11)$$

Accordingly, the particle diameter is calculated from the equation (12).

$$\text{particle diameter} = 5Vc/S = \{5(C/100/d)\times10^{-6}\}/S\ (\text{m}) = \{5(C/100/d)\times10^{-6}\times10^{10}\}/S\ (\text{Å}) \quad (12)$$

As described above, in the conventional platinum-loaded alumina catalyst, the particle diameter of the platinum loaded on the alumina carrier was measured (calculated) using the CO-pulse method or the transmission electron micrograph at that time (see FIG. 5(A)), in which error was relatively large. Therefore, in the conventional platinum-loaded alumina catalyst, the preferred range of the platinum particle diameter was set as a relatively wide range because it was difficult to control the platinum particle diameter with high accuracy.

In contrast to this, in the present invention, based on the value of the platinum particle diameter measured with relatively high accuracy according to the transmission electron micrograph in recent years (see FIG. 5(B)), a range of the platinum particle diameter (platinum particle diameter distribution) in which the catalyst life can be remarkably improved compared to the conventional platinum-loaded alumina catalyst is set. In the platinum-loaded alumina catalyst according to the present invention, it is preferred that 70% or more of the particles of platinum loaded on the γ-alumina carrier have a size of 8 to 15 Å in direct observation using the transmission electron microscope. More preferably, 80% or more of the particles of platinum loaded on the γ-alumina carrier have a size of 8 to 15 Å. Further preferably, 90% or more of the particles of platinum loaded on the γ-alumina carrier have a size of 8 to 15 Å.

Next, an egg shell-type metal-loaded catalyst and a uniform-type metal-loaded catalyst of the present invention will be described with reference to FIG. 2. The egg shell-type metal-loaded catalyst refers to a state where a metal member to be loaded is dispersed and loaded only on the outer shell part of the cross section of a molded catalyst. Namely, a metal loading part on which the metal member is loaded is formed in the outer shell part of a porous carrier. The uniform-type metal-loaded catalyst refers to a state where a metal member is dispersed over the entire cross section of the catalyst and the metal loading part on which the metal member is loaded is formed over the entire inside of a molded body of the porous carrier.

The platinum-loaded alumina catalyst according to the present invention includes an alumina carrier and platinum loaded on the alumina carrier.

Next, the alumina carrier used in the platinum-loaded alumina catalyst according to the present invention will be described.

The alumina carrier preferably is a porous γ-alumina carrier. More specifically, as disclosed in JPH6-72005B2, for example, the alumina carrier preferably is a porous γ-alumina carrier obtained by washing by filtration a slurry of aluminum hydroxide generated by neutralizing aluminum salt, dehydrating and drying the obtained alumina hydrogel, and then calcining the resultant at 400 to 800° C. for about 1 to 6 hours. More preferably, the alumina carrier is a porous γ-alumina carrier obtained through a pH swing process in which the pH of alumina hydrogel is alternately fluctuated between a pH range of the dissolution of alumina hydrogel and a pH range of the precipitation of boehmite gel and simultaneously an alumina hydrogel forming substance is added for growing crystals of the alumina hydrogel when the pH is fluctuated from at least either one of the pH ranges to the other one of the pH ranges. The porous γ-alumina carrier obtained through the pH swing process is excellent in the uniformity of pore distribution, and excellent in that the physical properties of each pellet are stable because there is less variation in the physical properties also in the alumina carrier pellet after the formation of the carrier.

The inventors of the present application made further study on the relationship between the drying and calcining conditions of the alumina hydrogel (boehmite) and the particle diameters of the loaded platinum and, as a result, found that to stably load many of the platinum particles on the γ-alumina carrier to have a size in the range of 8 to 15 Å, it is particularly preferred that the drying temperature is 200° C. or lower, the temperature of the calcination performed thereafter is 250 to 400° C., and the calcination time is 1 to 12 hours.

When preparing the uniform-type platinum-loaded alumina catalyst according to the present invention, there is no limitation on the sulfur or sulfur compound to be dispersed in the alumina carrier beforehand for incorporation thereof in so far as the sulfur or sulfur compound has a sulfur element and can be uniformly dispersed in the catalyst carrier during the preparation of the catalyst carrier of after the preparation of the catalyst carrier. For example, sulfur crystal powders, and sulfur-containing compounds such as sulfuric acid, and sulfate including ammonium sulfate can be mentioned as the sulfur or sulfur compound. From the viewpoint that sulfur is likely to disperse on a carrier, sulfur compounds having solubility in water or an organic solvent are preferable, and sulfuric acid, ammonium sulfate, etc. can be mentioned as such sulfur compounds.

The amount of sulfur to be contained in a carrier is preferably 0.15 to 5.0% by weight (wt %), and more preferably 0.15 to 3.0% by weight, calculated as elemental sulfur (S). When the sulfur content is less than 0.15% by weight, the degree that metal is uniformly loaded as far as the center of the catalyst is low, while when the sulfur content exceeds 5% by weight, a problem is likely to occur that sulfur is likely to locally agglomerate and metal is not dispersed and loaded on such a portion. In view of the above, the most suitable sulfur content range is 0.15 to 5.0% by weight considering the effect that metal is uniformly dispersed and loaded.

The inventors of the present application made further study on the relationship between the sulfur concentration and the particle diameters of the loaded platinum and, as a result, found that to stably load many of the platinum particles on the γ-alumina carrier to have a size in the range of 8 to 15 Å, it is particularly preferred that with respect to the range of sulfur content, sulfur or a sulfur compound is contained in a range of 0.5 to 1.2% by weight calculated as elemental sulfur (S).

In the present invention, with respect to a method of preparing a sulfur-containing catalyst carrier containing the above-mentioned sulfur or sulfur compound, usable is a method capable of incorporating the sulfur or sulfur compound in a state where the sulfur or sulfur compound is uniformly dispersed throughout the cross section of the carrier. For example, the following methods are mentioned: method A involving kneading sulfur powder in a metal hydroxide gel serving as a precursor of a metal oxide obtained when preparing a catalyst carrier, forming the resultant into a predetermined shape, and drying and calcining the resultant; method B involving preparing a metal hydroxide gel serving as a precursor of a metal oxide containing sulfur using metal sulfate and/or sulfuric acid when preparing a catalyst carrier, forming the resultant into a predetermined shape, and drying and calcining the resultant; method C involving forming a metal hydroxide gel serving as a precursor of a metal oxide into a predetermined shape when preparing a catalyst carrier, drying the resultant to form a dry metal hydroxide gel, impregnating the dry metal oxide with a sulfur compound solution, and calcining the same; method D involving forming a metal hydroxide gel serving as a precursor of a metal oxide into a predetermined shape when preparing a catalyst carrier, drying the resultant to form a dry metal hydroxide, impregnating the dry metal hydroxide with a sulfur compound solution, and calcining the same; and method E involving forming a metal hydroxide gel serving as a precursor of a metal oxide into a predetermined shape, drying the resultant to form a dry metal hydroxide gel, calcining the dry metal hydroxide gel to form a calcined metal oxide, impregnating the calcined metal oxide with a sulfur compound solution such as a sulfuric acid aqueous solution and an ammonium sulfate solution, and further calcining the resultant.

The inventors of the present application made further study on the method for preparing a sulfur-containing catalyst carrier and, as a result, found that to stably load many of the platinum particles on the γ-alumina carrier to have a size in the range of 8 to 15 Å, it is particularly preferred to disperse and load sulfur on the surface of the γ-alumina carrier according to the aforementioned method E.

With respect to calcining conditions when preparing the sulfur-containing catalyst carrier, usually, the calcining temperature is 100 to 1000° C., and preferably 350 to 800° C., and the calcining time is 0.5 to 48 hours, and preferably 1 to 24 hours. When the calcining temperature is lower than 350° C., conversion to an oxide from a hydroxide may not be fully performed, while when the calcining temperature is higher than 800° C., the surface area after calcining may be dramatically reduced.

The inventors of the present application made further study on the drying and calcining conditions when preparing a sulfur-containing γ-alumina carrier and, as a result, found that to stably load many of the platinum particles on the γ-alumina carrier to have a size in the range of 8 to 15 Å, it is particularly preferred that with respect to the drying condition, the drying temperature is 100 to 200° C. and the drying time is 3 to 12 hours, and with respect to the calcination condition, the calcination temperature 250 to 400° C. and the calcination time is 1 to 12 hours.

In the present invention, the amount of platinum to be loaded on the aforementioned sulfur-containing catalyst carrier is 0.05 to 5.0% by weight, preferably 0.1 to 3.0% by weight, calculated as elemental platinum. When the loading amount of platinum is less than 0.05% by weight, there is a problem that the activity is low, while when the loading amount of platinum exceeds 5.0% by weight, there are problems that the particle diameter of platinum increases, the selectivity is reduced, sintering is likely to occur, resulting in that deactivation is likely to occur.

The inventors of the present application made further study on the preferred loading amount of platinum and, as a result, found that to stably load many of the platinum particles on the γ-alumina carrier to have a size in the range of 8 to 15 Å, the loading amount of platinum is preferably 0.1 to 1.5% by weight calculated as content of elemental platinum, and more preferably, 0.5 to 1.5% by weight from the viewpoint of improvement of life of the prepared platinum-loaded alumina catalyst.

In the present invention, when platinum metal is loaded on the γ-alumina carrier, the above-mentioned γ-alumina carrier may be impregnated with a solution of platinum compound, dried, and then calcined at a predetermined temperature. As the platinum compound, chloride, bromide, ammonium salt, carbonyl compound, or various complex compounds, such as an amine complex, an ammine complex, and an acetylacetonato complex, of platinum can be mentioned. The platinum compound may be, for example, chloroplatinic acid, platinum acetylacetonate, ammonium platinate, bromo platinate, platinum dichloride, platinum tetrachloride hydrate, platinum carbonyl dichloride, dinitrodiamine platinate, or the like.

The inventors of the present application made further study on the platinum compound for impregnation and, as a result, found that from the viewpoint of improvement of life of the prepared platinum-loaded alumina catalyst, it is particularly preferred that the γ-alumina carrier after calcination is impregnated with platinum by using a chloroplatinic acid aqueous solution as a platinum reagent aqueous solution.

After the alumina carrier is impregnated with the above-mentioned solution of platinum compound, the alumina carrier to which the platinum compound adheres is dried at 50 to 200° C. for 0.5 to 48 hours, and thereafter is calcined at 350 to 600° C. for 0.5 to 48 hours, more preferably at 350 to 450° C. for 0.5 to 5 hours.

The inventors of the present application made further study on the drying and calcining conditions after suitable platinum impregnation to the alumina carrier (for example, the content calculated as elemental platinum is in a range of 0.5 to 1.5% by weight) and, as a result, found that to stably load many of the platinum particles on the γ-alumina carrier to have a size in the range of 8 to 15 Å, it is particularly preferred that with respect to the drying condition, the drying temperature is 100 to 200° C. and the drying time is 3 to 12 hours, and with respect to the calcination condition, the calcination temperature is 250 to 450° C. and the calcination time is 1 to 8 hours.

Then, as a final step of the platinum loading process, the alumina carrier to which the platinum compound adheres is placed in a hydrogen gas atmosphere and a hydrogen reduction process is performed under reduction condition at 350 to 600° C. for 0.5 to 48 hours, preferably at 350 to 550° C. for 3 to 24 hours. If the temperature during hydrogen reduction is lower than 350° C., a problem that platinum is not sufficiently reduced occurs, and if the temperature exceeds 600° C., a problem that the platinum particles are sintered during reduction and the metal dispersion degree is lowered occurs.

The inventors of the present application made further study on the temperature condition of the hydrogen reduction after suitable platinum impregnation and calcination and, as a result, found that to stably load many of the platinum particles on the γ-alumina carrier to have a size in the range of 8 to 15 Å, it is particularly preferred that the temperature of the hydrogen reduction is 300 to 450° C. and is lower than or equal to the temperature for calcination after platinum impregnation and that the hydrogen reduction time is 1 to 15 hours.

The amount of alkali that is added to the aforementioned egg shell-type platinum-loaded alumina catalyst and the uniform-type platinum-loaded alumina catalyst prepared by making sulfur contained in the γ-alumina carrier is 0.1 to 5% by weight, preferably 0.3 to 3.0% by weight, and more preferably 0.5 to 1.5% by weight. When the loading amount of alkali metal is less than 0.1% by weight, there is a problem that the catalyst life is short and the effect is low, while when the loading amount is more than 5.0% by weight, there is a problem that the activity is lowered and the catalyst life is shortened.

The inventors of the present application made further study on a preferred addition amount of alkali in loading many of the platinum particles on the γ-alumina carrier to have a size in the range of 8 to 15 Å and, as a result, found that so long as the addition amount of alkali is 0.5 to 1.5% by weight, there is no significant influence on the size of the platinum particles after preparation.

The compound of alkaline metal used when loading the alkaline metal to the egg shell-type platinum-loaded alumina catalyst and the uniform-type platinum-loaded alumina catalyst prepared by making sulfur contained in the γ-alumina carrier may be, for example, a chloride, bromide, iodide, nitrate, sulfate, acetate, propionic acid, and the like of, the alkaline metal, which preferably is water-soluble and/or soluble to an organic solvent such as acetone. Such a compound may be, for example, sodium chloride, sodium bromide, sodium iodide, sodium nitrate, sodium sulfate, sodium acetate, sodium propionate, potassium chloride, potassium bromide, potassium iodide, potassium nitrate, potassium sulfate, potassium acetate, potassium propionate, calcium chloride, calcium bromide, calcium iodide, calcium nitrate, calcium sulfate, calcium acetate, calcium propionate, or the like.

Also, when the alkaline metal is loaded on the egg shell-type platinum-loaded alumina catalyst and the uniform-type platinum-loaded alumina catalyst prepared by making sulfur contained in the γ-alumina carrier, they are impregnated with a solution of a compound of the alkaline metal, thereafter dried under a drying condition at room temperature to 200° C. for 0.5 to 48 hours, preferably at 50 to 150° C. for 0.5 to 24 hours, more preferably at 80 to 120° C. for 0.5 to 5 hours, and then calcined at 350 to 600° C. for 0.5 to 48 hours, preferably 350 to 450° C. for 0.5 to 5 hours.

The inventors of the present application made further study on the drying condition after the impregnation with a solution of a preferred alkali compound in loading many of the platinum particles on the γ-alumina carrier to have a size in the range of 8 to 15 Å and, as a result, found that so long as the temperature is at room temperature to 200° C., there is no influence on the size of the loaded platinum particles irrespective of the drying time.

The dried matter on which the alkali metal is loaded, which is obtained by impregnating the alkali metal into the egg shell-type platinum-loaded alumina catalyst and the uniform-type platinum-loaded alumina catalyst prepared by making sulfur contained in the γ-alumina carrier and drying the impregnated catalyst, is not calcined thereafter, and is directly subjected to final hydrogen reduction. The reduction condition of this hydrogen reduction is preferably at 350 to 600° C. for 0.5 to 48 hours, more preferably at 350 to 550° C. for 3 to 24 hours in a hydrogen gas atmosphere. If calcination is performed prior to the hydrogen reduction of the dried matter on which the alkali metal is loaded, there arises a problem that the catalyst performance related to activity, selectivity, and life is lowered. Also, if the temperature at the time of the hydrogen reduction is lower than 350° C., there arises a problem that platinum is not fully reduced, and if the temperature at the time of the hydrogen reduction exceeds 600° C., there arises a problem that sintering of platinum particles occurs at the time of reduction, and the metal dispersion degree is lowered.

The inventors of the present application made further study on the hydrogen reduction condition after the impregnation with a solution of a preferred alkali compound and drying in loading many of the platinum particles on the γ-alumina carrier to have a size in the range of 8 to 15 Å and, as a result, found that if the temperature and the reduction time are less than or equal to the temperature and the reduction time of the hydrogen reduction carried out as the final step of the platinum loading process before addition of the alkali metal, there is no influence on the size of the loaded platinum particles.

Hereinafter, preferable embodiments of the dehydrogenation catalyst of the present invention will be specifically described based on Examples and Comparative Examples.

[Comparative Example 1] (Comparison of Measurement Results of Particle Diameters of the Egg Shell-Type Catalysts Described in Patent Document 3 and the Uniform-Type Platinum-Loaded Alumina Catalysts Described in Patent Document 4 Between Direct Observation Using a Transmission Electron Microscope and the CO-Pulse Method)

The platinum particle diameters of the egg shell-type catalysts described in Patent Document 3 are particle diameters estimated based on the dispersion degree estimated from the CO adsorption amount measured by the CO-pulse method with the assumption that the shape of the platinum particle is a cube and, as shown in Table 2 (Experimental Example 1) and Table 3 (Experimental Example 2) of Patent Document 3, were estimated as particle diameters in a range of 5.5 to 14 Å.

On the other hand, the particle diameters of the uniform-type platinum-loaded alumina catalysts described in Patent Document 4 were estimated as particle diameters of 6.5 to 11 Å, as shown in Table 1 (Embodiment 4) of Patent Document 4.

Figure 6:
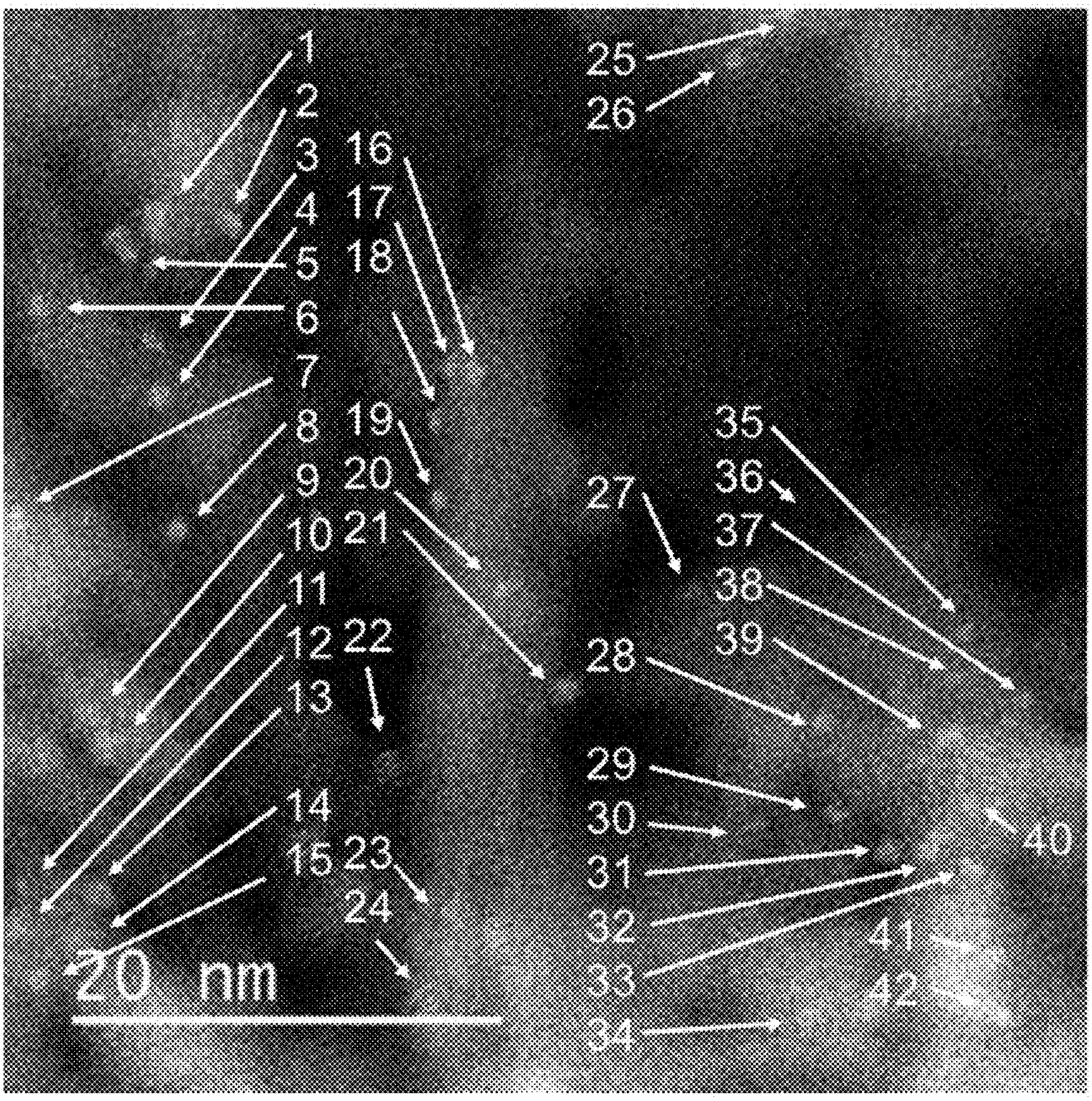
FIG. 6 is an explanatory diagram related to measurement of platinum particle diameters based on the transmission electron micrograph.

As shown in FIG. 6, by direct observation using a transmission electron microscope, the particle diameters of 42 platinum particles (see the numbers 1-42 in FIG. 6) in a uniform-type platinum-loaded alumina catalyst described in Patent Document 4 were measured. The image of the catalyst shown in FIG. 6 corresponds to the transmission electron micrograph shown in FIG. 5(B). Also, this catalyst corresponds to the catalyst No. 6 (the particle diameter is 6.5 Å) described in Patent Document 4 (Table 1).

The measurement of platinum particle diameters can be performed by using a particle diameter measurement function on the screen of the electron microscope. Note, however, that it is also possible to obtain substantially the same measurement result by comparing the length of a part of the particle diameter having the largest diameter with a scale shown in the electron micrograph. Table 1 shows the measurement result of the particle diameters. The average particle diameter of the 42 platinum particles shown in Table 1 was 16.8 Å (1.68 nm).

TABLE 1

| No. | particle diameter (nm) |
|---|---|
| 1 | 2.0 |
| 2 | 1.8 |
| 3 | 1.5 |
| 4 | 2.0 |
| 5 | 2.3 |
| 6 | 1.3 |
| 7 | 1.4 |

TABLE 1-continued

| No. | particle diameter (nm) |
|---|---|
| 8 | 1.2 |
| 9 | 1.7 |
| 10 | 2.0 |
| 11 | 0.8 |
| 12 | 1.6 |
| 13 | 1.4 |
| 14 | 1.5 |
| 15 | 1.4 |
| 16 | 1.5 |
| 17 | 1.1 |
| 18 | 1.3 |
| 19 | 1.2 |
| 20 | 1.0 |
| 21 | 1.6 |
| 22 | 2.2 |
| 23 | 1.4 |
| 24 | 1.3 |
| 25 | 1.5 |
| 26 | 1.4 |
| 27 | 1.3 |
| 28 | 1.2 |
| 29 | 1.2 |
| 30 | 1.3 |
| 31 | 1.7 |
| 32 | 1.7 |
| 33 | 1.8 |
| 34 | 1.2 |
| 35 | 1.3 |
| 36 | 1.2 |
| 37 | 1.1 |
| 38 | 1 |
| 39 | 1.9 |
| 40 | 1.3 |
| 41 | 1.2 |
| 42 | 1.3 |
| 43 | — |
| 44 | — |
| 45 | — |
| 46 | — |
| 47 | — |
| 48 | — |
| 49 | — |
| 50 | — |

According to the measurement result of the platinum particle diameters shown in Table 1, it is seen that, of the 42 platinum particles measured, 19 (about 45%) platinum particles had a size in a range of 8 to 15 Å (0.8 to 1.5 nm), and 23 platinum particles were larger than 15 Å (1.5 nm) and had a size of 16 Å (1.6 nm) or larger.

Thus, when measured from the image for direct observation of the uniform-type platinum-loaded alumina catalyst described in Patent Document 4 (the catalyst No. 6 in Table 1 of Patent Document 4) taken by the electron microscope, the average particle diameter of platinum was 1.68 nm (16.8 Å). From this, it is seen that the estimated value (6.5 Å) of the particle diameter of platinum according to the CO-pulse method described in Patent Document 4 is a remarkably small value compared to the value measured by direct observation of the electron micrograph.

As described above, with respect to the egg shell-type catalysts described in Patent Document 3 and the uniform-type platinum-loaded alumina catalysts described in Patent Document 4, the particle diameters estimated based on the dispersion degree estimated from the CO adsorption amount measured by the CO-pulse method and the assumption that the shape of the platinum particle is a cube were estimated as particle diameters of 5.5 to 14 Å, but these particle diameters also are considered to be fairly small values according to the direct observation using the electron microscope.

The large error of the estimated value of the particle diameter obtained by the CO-pulse method like this is considered to be attributed to that in the CO-pulse method, the estimation is made on an assumption that the introduced CO is adsorbed on the platinum atoms exposed on the surface of platinum particles but actually there are many CO molecules adsorbed on the alumina carrier and therefore the CO adsorption amount is observed to be larger, and that the shape of the platinum particle is assumed to be a cube and the particle diameter is estimated as a length of one side thereof.

[Comparative Example 2] (Preparation Method Described in an Embodiment of Patent Document 3)

A preparation method of an egg shell-type platinum-loaded γ-alumina catalyst described in an embodiment of Patent Document 3 is explained.

Similarly to the embodiment of Patent Document 3, a porous γ-alumina carrier was produced according to the conventional technology described in Embodiment 1 of JPH6-72005B2. An outline of this method is as follows. A sodium aluminate aqueous solution was instantaneously added in hot dilute sulfuric acid while being vigorously stirred to obtain an aluminum hydroxide slurry suspension (pH10). This suspension was used as seed aluminum hydroxide and while stirring was continued, an operation of alternately adding the hot dilute sulfuric acid and the sodium aluminate aqueous solution at a constant interval was repeated to obtain filtered and washed cake. This cake was extruded and dried, and thereafter was calcined at 500° C. for 3 hours.

The γ-alumina carrier thus prepared physical properties of a surface area of 240 $m^2$/g, a pore volume of 0.713 $cm^3$/g, an average pore diameter of 119 Å, and an occupancy of pores with pore diameters 90 to 300 Å of 90%. 79 g of 0.4 wt %-chloroplatinic acid aqueous solution prepared so that the pH value was 2.0 was added to 20 g of this porous γ-alumina carrier, and this was left for 3 hours for impregnation before water was removed by decantation. Subsequently, the resultant was dried for 3 hours at 120° C. and then was calcined for 3 hours at 400° C. in a muffle furnace under air flow. The obtained calcined matter was cooled to normal temperature in the desiccator and thereafter was reduced at 400° C. for 15 hours under hydrogen flow to prepare a dehydrogenation catalyst (corresponds to the catalyst No. 2 in Table 2 of the embodiment of Patent Document 3). The estimated value of the platinum particle diameter of this catalyst according to the CO-pulse method was 5.5 Å.

[Comparative Example 3] (Preparation Method Described in an Embodiment of Patent Document 4)

A preparation method of a uniform-type platinum-loaded γ-alumina catalyst described in an embodiment of Patent Document 4 is explained.

3900 cc of aluminum nitrate aqueous solution with a concentration of 2.67 mol/L was prepared and simultaneously, 3900 cc of 14% aqueous ammonia solution was prepared. 20 L of pure water was put in a 30-L enamel container, and the container was warmed to 70° C. under stirring. While continuing stirring, a pH swing operation in which 1300 cc of aluminum nitrate aqueous solution was added, followed by stirring for 5 minutes (pH=2.0), and thereafter, 1300 cc of aqueous ammonia solution was added, followed by stirring for 5 minutes (pH=7.4) was performed 4 times. An aqueous slurry solution of the obtained aluminum hydroxide was filtered to recover a cake, and subsequently, a washing operation in which the cake was re-dispersed in 20 L of pure water and was filtered again was performed 3 times, obtaining a washed gel.

The washed cake was air dried to adjust the moisture, and then was formed into a rod-like shape having a diameter of 1.6 mm with an extruder. The resultant was dried (120° C., 3 hours), crushed to about 1 cm in length, and calcined in a muffle furnace (500° C., 3 hours), thereby yielding an alumina carrier A containing no sulfur. The obtained alumina carrier A had a BET surface area of 275 $m^2/g$ and a pore volume of 0.65 $cm^3/g$ as measured by mercury porosimetry. Also, the obtained alumina carrier A had an average pore diameter of 8.9 nm and had a sharp pore distribution in which almost all of the pores were concentrated near the average pore diameter. In addition, the volume occupied by pores having a diameter of 7 to 10 nm was 80% or more of the total pore volume.

The alumina carrier A was impregnated with an ammonium sulfate aqueous solution with a concentration of 0.38 mol/L so that the sulfur content after calcination was 0.5% by weight, and the solvent was removed with an evaporator. Thereafter, the alumina carrier A was dried (120° C., 3 hours) and calcined (500° C., 3 hours), thereby yielding an alumina carrier containing sulfur at 0.5% by weight.

The alumina carrier thus prepared was impregnated with a chloroplatinic acid aqueous solution whose pH was adjusted to 2.0 so that the loading amount of platinum after calcination was 0.6% by weight. Thereafter, moisture was removed with an evaporator, and the resultant was dried (120° C., 3 hours) and calcined (400° C., 3 hours). Then, the resultant was charged in a flow-type hydrogen-reducing apparatus, and hydrogen reduction was carried out at 450° C. for 15 hours in a hydrogen stream, thereby yielding a 0.6 wt % platinum-loaded alumina catalyst. The estimated value of the platinum particle diameter of this platinum-loaded alumina catalyst according to the CO-pulse method was 6.5 Å.

[Comparative Example 4] (Reaction Test Method Related to the Egg Shell-Type Catalyst Described in Patent Document 3 and the Uniform-Type Catalyst Described in Patent Document 4)

Comparison of dehydrogenation reaction test methods and reaction test results related to the egg shell-type catalyst described in Patent Document 3 and the uniform-type catalyst described in Patent Document 4 is shown. Here, the dehydrogenation reaction test described in Patent Document 3 and the dehydrogenation reaction test described in Patent Document 4 differ with respect to the condition of reaction temperature and concentration of hydrogen supplied with the raw material MCH. This is because the deterioration speed is different between the dehydrogenation catalyst described in Patent Document 3 and the dehydrogenation catalyst described in Patent Document 4. The reaction test condition of the deterioration speed at the time of development of the dehydrogenation catalyst described in Patent Document 3 was a condition in which deterioration was relatively hard to progress. Specifically, the reaction test condition described in Patent Document 3 was a condition with a reaction temperature of 300° C. and a hydrogen supply concentration of 20%, whereas the reaction condition described in Patent Document 4 was a condition with a reaction temperature of 320° C. and a hydrogen supply concentration of 5%. The reason for this is that since the dehydrogenation catalyst described in Patent Document 4 is a catalyst having a low deterioration speed and hard to deteriorate, the reaction test was performed under an accelerated condition in which deterioration is easy to progress.

In this Comparative Example, with respect to the dehydrogenation reaction test of methylcyclohexane (MCH), the results of dehydrogenation reaction tests using the dehydrogenation catalyst described in Patent Document 3 as the catalyst NO. 1 and the dehydrogenation catalyst described in Patent Document 4 as the catalyst NO. 2 are shown.

10 cc of each catalyst described above was put in a stainless steel reaction tube, which had an inside diameter of 12.6 mm and a length of 300 mm and which was equipped with a protection tube for a thermocouple whose outer dimension was ⅛ inch in the center of the cross section of the reaction tube, such that the center of the catalyst layer was positioned in a lengthwise center of the reaction tube, and 10 cc of spherical α-alumina beads with a diameter of 1 mm was placed on the upper side of the catalyst as a preheating layer. Under hydrogen flow (LHSV=5.0; 50 cc/hr), temperature was raised until the central temperature of the catalyst layer reaches 320° C. Subsequently, methylcyclohexane (MCH) in an amount corresponding to LHSV=2.0 (20 cc/hr) was supplied to the reactor with a liquid supply pump for high-speed liquid chromatography (HPLC) (HPLC pump), and immediately, the flow rate of hydrogen was adjusted so that the hydrogen gas amount was 5 mol % with respect to the total amount of MCH and hydrogen gas. The reaction test was performed while adjusting the output of an electric furnace so that the central temperature of the catalyst layer was 320° C. during the reaction.

A gas-liquid separator was provided at the outlet of the reaction tube, and the resultant was separated into a liquid product such as toluene and gas such as hydrogen gas, which were generated by the dehydrogenation reaction, and the collected liquid product and gas were separately analyzed by gas chromatography.

The MCH conversion rate (%), toluene selectivity (%), toluene yield (%), and produced methane concentration (ppm) 24 hours after and 300 hours after the initiation of the reaction were obtained. The results are shown in Table 2.

| | | | after 24 hours from initiation of reaction | | | | after 300 hours from initiation of reaction | | | |
|---|---|---|---|---|---|---|---|---|---|---|
| catalyst No. | sulfur content (wt %) | plutinum loading amount (wt %) | MCH conversion rate (%) | toluene selectivity (%) | toluene yield (%) | produced methane concentration (ppm) | MCH conversion rate (%) | toluene selectivity (%) | toluene yield (%) | produced methane concentration (ppm) |
| 1 | 0 | 0.6 | 98.2 | 99.88 | 98.1 | 180 | 94.5 | 99.9 | 94.4 | 115 |
| 2 | 0.5 | 0.6 | 98.2 | 99.92 | 98.1 | 50 | 97.7 | 99.93 | 97.6 | 35 |

[Example 1] (Preparation Method and Particle Diameter Measurement Result of the Egg Shell-Type Catalyst According to the Present Invention)

3900 cc of aluminum nitrate aqueous solution with a concentration of 2.67 mol/L was prepared and simultaneously, 3900 cc of 14% aqueous ammonia solution was prepared. 20 L of pure water was put in a 30-L enamel container, and the container was warmed to 70° C. under stirring. While continuing stirring, a pH swing operation in which 1300 cc of aluminum nitrate aqueous solution was added, followed by stirring for 5 minutes (pH=2.0), and thereafter, 1300 cc of aqueous ammonia solution was added, followed by stirring for 5 minutes (pH=7.4) was performed 4 times. An aqueous slurry solution of the obtained aluminum hydroxide was filtered to recover a cake, and subsequently, a washing operation in which the cake was re-dispersed in 20 L of pure water and was filtered again was performed 3 times, obtaining a washed gel.

The washed cake was air dried to adjust the moisture, and then was formed into a rod-like shape having a diameter of 1.6 mm with an extruder. The resultant was dried (120° C., 3 hours), crushed to about 1 cm in length, and calcined in a muffle furnace (350° C., 3 hours), thereby yielding an alumina carrier A containing no sulfur. The obtained alumina carrier A had a BET surface area of 290 $m^2/g$ and a pore volume of 0.61 $cm^3/g$ as measured by mercury porosimetry. Also, the obtained alumina carrier A had an average pore diameter of 9.5 nm (95 Å) and had a sharp pore distribution in which almost all of the pores were concentrated near the average pore diameter. In addition, the volume occupied by pores having a diameter of 7 to 11 nm (70 to 110 Å) was 80% or more of the total pore volume.

The alumina carrier thus prepared was impregnated with a chloroplatinic acid aqueous solution whose pH was adjusted to 2.0 so that the loading amount of platinum after calcination was 0.6% by weight. Thereafter, moisture was removed with an evaporator, and the resultant was dried (120° C., 3 hours) and calcined (350° C., 3 hours). Then, the alumina carrier was placed in a flow-type hydrogen-reducing apparatus, and hydrogen reduction was carried out at 400° C. for 15 hours in a hydrogen stream, thereby yielding a 0.6 wt % platinum-loaded alumina catalyst (hereinafter referred to as a catalyst NO. 3). In the catalyst NO. 3 thus obtained, the average particle diameter of the platinum particles as measured by direct observation using an electron microscope was 11.27 Å. Table 3 shows the measurement result of the platinum particle diameter.

TABLE 3

| No. | particle diameter (nm) |
|---|---|
| 1 | 1.5 |
| 2 | 0.9 |
| 3 | 1.3 |
| 4 | 1.5 |
| 5 | 1.3 |
| 6 | 1.1 |
| 7 | 1.2 |
| 8 | 1.9 |

TABLE 3-continued

| No. | particle diameter (nm) |
|---|---|
| 9 | 1.5 |
| 10 | 1.2 |
| 11 | 1.0 |
| 12 | 1.4 |
| 13 | 1.4 |
| 14 | 1.8 |
| 15 | 1.4 |
| 16 | 1.3 |
| 17 | 0.9 |
| 18 | 1.1 |
| 19 | 1.0 |
| 20 | 0.9 |
| 21 | 1.4 |
| 22 | 1.7 |
| 23 | 1.2 |
| 24 | 0.8 |
| 25 | 1.3 |
| 26 | 1.5 |
| 27 | 1.1 |
| 28 | 1.2 |
| 29 | 1.0 |
| 30 | 1.1 |
| 31 | 1.5 |
| 32 | 1.5 |
| 33 | 2.1 |
| 34 | 1.0 |
| 35 | 1.1 |
| 36 | 1.0 |
| 37 | 1.5 |
| 38 | 0.8 |
| 39 | 1.6 |
| 40 | 1.1 |
| 41 | 1.0 |
| 42 | 1.1 |
| 43 | 1.4 |
| 44 | 1.2 |
| 45 | 1.3 |
| 46 | — |
| 47 | — |
| 48 | — |
| 49 | — |
| 50 | — |

In Table 3, it is seen that the smallest platinum particle was 8 Å (0.8 nm) in size, and the largest platinum particle was 21 Å (2.1 nm) in size. Also, of the 45 platinum particles measured, 40 (about 89%) platinum particles had a size in a range of 8 to 15 Å (0.8 to 1.5 nm), and only 5 platinum particles were larger than 15 Å (1.5 nm) and had a size of 16 Å (1.6 nm) or larger.

[Example 2] (Preparation Method and Particle Diameter Measurement Result of the Uniform-Type Catalyst According to the Present Invention)

3900 cc of aluminum nitrate aqueous solution with a concentration of 2.67 mol/L was prepared and simultaneously, 3900 cc of 14% aqueous ammonia solution was prepared. 20 L of pure water was put in a 30-L enamel container, and the container was warmed to 70° C. under stirring. While continuing stirring, a pH swing operation in which 1300 cc of aluminum nitrate aqueous solution was added, followed by stirring for 5 minutes (pH=2.0), and thereafter, 1300 cc of aqueous ammonia solution was added, followed by stirring for 5 minutes (pH=7.4) was performed 4 times. An aqueous slurry solution of the obtained aluminum hydroxide was filtered to recover a cake, and subsequently, a washing operation in which the cake was re-dispersed in 20 L of pure water and was filtered again was performed 3 times, obtaining a washed gel.

The washed cake was air dried to adjust the moisture, and then was formed into a rod-like shape having a diameter of 1.6 mm with an extruder. The resultant was dried (120° C., 3 hours), crushed to about 1 cm in length, and calcined in a muffle furnace (350° C., 3 hours), thereby yielding an alumina carrier A containing no sulfur. The obtained alumina carrier A had a BET surface area of 290 $m^2/g$ and a pore volume of 0.61 $cm^3/g$ as measured by mercury porosimetry. Also, the obtained alumina carrier A had an average pore diameter of 9.5 nm (95 Å) and had a sharp pore distribution in which almost all of the pores were concentrated near the average pore diameter. In addition, the volume occupied by pores having a diameter of 7 to 11 nm (70 to 110 Å) was 80% or more of the total pore volume.

The γ-alumina carrier thus prepared was impregnated with an ammonium sulfate aqueous solution with a concentration of 0.38 mol/L so that the sulfur content after calcination was 0.5% by weight, and after the solvent was removed with an evaporator, the resultant was dried (120° C., 3 hours) and calcined (350° C., 3 hours), thereby yielding an alumina carrier containing sulfur.

The obtained alumina carrier was impregnated with a chloroplatinic acid aqueous solution whose pH was adjusted to 2.0 so that the loading amount of platinum after calcination was 0.6% by weight. Thereafter, moisture was removed with an evaporator, and the resultant was dried (120° C., 3 hours) and calcined (350° C., 3 hours). Then, the alumina carrier was placed in a flow-type hydrogen-reducing apparatus, and hydrogen reduction was carried out at 400° C. for 15 hours in a hydrogen stream, thereby yielding a 0.6 wt % platinum-loaded alumina catalyst (hereinafter referred to as a catalyst NO. 4). In the catalyst NO. 4 thus obtained, the average particle diameter of the platinum particles as measured by direct observation using an electron microscope was 11.27 Å. Table 4 shows the measurement result of the platinum particle diameter.

TABLE 4

| No. | particle diameter (nm) |
|---|---|
| 1 | 1.3 |
| 2 | 1.5 |
| 3 | 1.4 |
| 4 | 1.9 |
| 5 | 1.4 |
| 6 | 1.2 |
| 7 | 1.3 |
| 8 | 1.1 |
| 9 | 1.5 |
| 10 | 1.8 |
| 11 | 0.8 |
| 12 | 1.7 |
| 13 | 1.5 |
| 14 | 1.5 |
| 15 | 1.5 |
| 16 | 1.4 |
| 17 | 1.0 |
| 18 | 1.2 |
| 19 | 1.1 |
| 20 | 1.0 |
| 21 | 1.5 |
| 22 | 1.3 |

TABLE 4-continued

| No. | particle diameter (nm) |
|---|---|
| 23 | 1.3 |
| 24 | 1.2 |
| 25 | 1.4 |
| 26 | 2.2 |
| 27 | 1.2 |
| 28 | 1.1 |
| 29 | 1.1 |
| 30 | 1.2 |
| 31 | 1.5 |
| 32 | 1.4 |
| 33 | 1.7 |
| 34 | 1.1 |
| 35 | 1.2 |
| 36 | 0.8 |
| 37 | 1.0 |
| 38 | 1.2 |
| 39 | 1.4 |
| 40 | 1.2 |
| 41 | 1.4 |
| 42 | 1.5 |
| 43 | 1.6 |
| 44 | 1.3 |
| 45 | 1.2 |
| 46 | 1.4 |
| 47 | 1.3 |
| 48 | — |
| 49 | — |
| 50 | — |

In Table 4, the smallest platinum particle was 8 Å (0.8 nm) in size, and the largest platinum particle was 22 Å (2.2 nm) in size. Also, of the 47 platinum particles measured, 41 (about 87%) platinum particles had a size in a range of 8 to 15 Å (0.8 to 1.5 nm), and only 6 platinum particles were larger than 15 Å (1.5 nm) and had a size of 16 Å (1.6 nm) or larger.

[Example 3] (Reaction Test Results of the Egg Shell-Type Catalyst and the Uniform-Type Catalyst According to the Present Invention)

For the egg shell-type platinum-loaded γ-alumina catalyst prepared under the preparation condition according to the present invention shown in Example 1 (catalyst NO. 3) and the uniform-type platinum-loaded γ-alumina catalyst prepared under the preparation condition according to the present invention shown in Example 2 (catalyst NO. 4), the dehydrogenation reaction test of methylcyclohexane was carried out according to the method and reaction condition similar to the method shown in Comparative Example 4. Table 5 shows the results of the dehydrogenation reaction test together with the average particle diameter of the platinum particles measured based on direct observation of the images taken by the electron microscope and the results of calculating the ratio of the number of platinum particles having a size in a range of 8 to 15 Å among the platinum particles measured.

TABLE 5

| catalyst No. | sulfur content (wt %) | plutinum loading amount (wt %) | after 24 hours from initiation of reaction: MCH conversion rate (%) | after 24 hours: toluene selectivity (%) | after 24 hours: toluene yield (%) | after 300 hours from initiation of reaction: MCH conversion rate (%) | after 300 hours: toluene selectivity (%) | after 300 hours: toluene yield (%) | plutinum average particle diameter (Å): CO-pulse method | plutinum average particle diameter (Å): direct observation method | ratio of plutinum particles having diameter in a range of 8-15 Å as measured by direct observation (%) |
|---|---|---|---|---|---|---|---|---|---|---|---|
| 1 | 0 | 0.6 | 98.2 | 99.88 | 98.1 | 94.5 | 99.90 | 94.4 | 5.5 | — | |
| 2 | 0.5 | 0.6 | 98.2 | 99.92 | 98.1 | 97.7 | 99.93 | 97.6 | 6.5 | 16.8 | 45.2 |
| 3 | 0 | 0.6 | 98.4 | 99.91 | 98.3 | 96.2 | 99.90 | 96.1 | — | 12.7 | 88.9 |
| 4 | 0.5 | 0.6 | 98.4 | 99.95 | 98.4 | 98.1 | 99.93 | 98.0 | — | 13.4 | 84.4 |

As seen from the reaction test results of Table 5, as a result of optimizing the condition of catalyst preparation according to the present invention, platinum-loaded alumina catalysts having excellent performance particularly in the catalyst life were obtained. Compared to the egg shell-type platinum-loaded γ-alumina catalyst prepared under the conventional preparation condition (catalyst NO. 1), the egg shell-type platinum-loaded γ-alumina catalyst prepared under the preparation condition according to the present invention (catalyst NO. 3) is smaller in the reduction of toluene yield and has a longer life. Also, compared to the uniform-type platinum-loaded γ-alumina catalyst prepared under the conventional preparation condition (catalyst NO. 2), the uniform-type platinum-loaded γ-alumina catalyst prepared under the preparation condition according to the present invention (catalyst NO. 4) is smaller in the reduction of toluene yield and has a longer life.

Since the reaction test of Table 5 was carried out under the accelerated test condition, the amount of deterioration of toluene yield after about 300 hours appears small. However, the amount of deterioration under the accelerated test condition is remarkably larger than the amount of deterioration under the actual reaction condition in commercialization, and roughly speaking, while the life of the catalyst NO. 1 in Table 5 is about one year and the life of the catalyst NO. 2 is about two years, the life of the catalyst NO. 3 can be expected to be about three years, and the life of the catalyst NO. 4 can be expected to be about four years.

In addition, in the catalysts according to the present invention (catalyst NO. 3, catalyst NO. 4) in which the catalyst life is improved by the preparation methods shown in Example 1 and Example 2, among the all platinum particles for which the platinum particle diameter was measured by direct observation of the observation image taken by the electron microscope, 80% or more of the platinum particles had a particle diameter in the range of 8 to 15 Å. Compared to the catalyst NO. 2 in which the ratio of the number of particles having a particle diameter in the range of 8 to 15 Å was about 45%, it is seen that in the catalysts according to the present invention, the ratio of the number of platinum particles having a particle diameter in the range of 8 to 15 Å is significantly high and the ratio of the platinum particles having a size of 16 Å or greater is remarkably decreased.

The reason that the catalyst life of the catalysts prepared by the preparation methods shown in Example 1 and Example 2 according to the present invention (catalyst NO. 3, catalyst NO. 4) was conspicuously improved as described above is considered to be that the calcination condition when preparing the γ-alumina carrier, the calcination condition after impregnating platinum (and sulfur, if necessary) and drying, and the condition when finally carrying out hydrogen reduction were optimized.

The reason that the life of the conventional catalysts (namely, the dehydrogenation catalysts described in Patent Document 3 and Patent Document 4) was hindered is considered to be that in the conventional preparation method, the calcination condition when preparing the γ-alumina carrier was over 400° C., the calcination condition after impregnating platinum (and sulfur, if necessary) and drying was similarly at high temperature, and the final hydrogen reduction temperature was high similarly to the calcination conditions when preparing the carrier and after impregnation of platinum (and sulfur, if necessary) and drying. Particularly, it was found to be more preferable that in the preparation of the catalyst, the final hydrogen reduction temperature is set to 400° C. or lower and the calcination which causes thermal history before the hydrogen reduction is carried out at a temperature lower than the final hydrogen reduction condition.

Note that the catalysts according to the present invention cannot be accomplished with the electron microscope technology that could be used for the conventional catalysts (namely, at the time of filing of patent applications related to the dehydrogenation catalysts described in Patent Document 3 and Patent Document 4), and could be accomplished due to evolution of the electron microscope technology thereafter in which the electron microscope technology has been progressed to enable the size of the platinum particles of the catalysts prepared under various catalyst preparation conditions to be accurately measured by direct observation.

INDUSTRIAL APPLICABILITY

The hydrogen station of the present invention that uses the OCH method is highly safe and can be favorably used as a hydrogen station for refilling a moving body equipped with a fuel cell, such as an FCV, a fuel cell forklift, a fuel cell ship, etc. with hydrogen. The OCH method is a highly safe method in which hydrogen is stored and transported in the form of MCH which is liquid at normal temperature and normal pressure, and considering that there is a high possibility that a large-scale supply chain will be constructed for hydrogen for use in hydrogen thermal power generation, there is a possibility that low-cost MCH can be used in hydrogen stations in a large-scale. The hydrogen carrier can be delivered to regions including rural areas and remote islands by use of railroad transportation, lorry transportation, and ship transportation which are existing transportation infrastructures for gasoline and kerosene, and therefore, the hydrogen station that uses the OCH method is suitable for deployment of hydrogen stations all over the country from 2030 and beyond, and the hydrogen producing method thereof is a method that is applicable to the future national stockpile, and thus, there is a possibility that the method can be applied widely for greater spread of hydrogen. Thus, the present invention has very high industrial applicability.

LIST OF REFERENCE NUMERALS

1: hydrogen station
3: dehydrogenation unit
4: MCH tank
6: toluene tank
9: compressor
11: pressure accumulator
15: dispenser
17: precooler
23: dehydrogenation reactor
25: heat exchanger
26: heat supply device
27: storage tank
28: catalytic combustion coil
28A: fuel inlet part
31: gas-liquid separator
33: PSA device
37: purge gas pump
39: purge gas tank
41: air supply pump
43: connection part
45: exhaust regulating valve
L1: raw material supply line
L3: toluene discharge line
L5-L7: hydrogen transportation line
L11: filling hose
L13: first coolant circulation line
L21: reaction product gas line
L23: heat medium circulation line
L25: crude hydrogen transportation line
L31: discharge purge gas line
L33: purge gas supply line
L37: air supply line
L37A: split air supply line
L38: tank gas discharge line
L38A: branch line
L39: exhaust gas line
L41: second coolant circulation line

What is claimed is:

1. A hydrogen station, comprising:

a dehydrogenation reactor that produces hydrogen by dehydrogenation reaction of a hydrogenated aromatic in presence of a dehydrogenation catalyst;

a heat supply device that supplies heat to the dehydrogenation reactor via heat medium heated by using fuel; and a PSA device that purifies a reaction product gas containing hydrogen produced by the dehydrogenation reactor, by using an adsorbent according to a pressure swing adsorption method, wherein the PSA device is supplied with a purge gas containing hydrogen used in regeneration of the adsorbent, the heat supply device comprises a storage tank that stores the heat medium and a catalytic combustion tube that is disposed in the storage tank to catalytically combust the fuel in presence of a combustion catalyst, the catalytic combustion tube is supplied with the purge gas discharged from the PSA device as the fuel together with air, the dehydrogenation catalyst comprises a platinum-loaded alumina catalyst, the combustion catalyst includes a first catalyst packed in a fuel inlet part of the catalytic combustion tube to which the fuel is introduced, and a second catalyst having a structure different from the first catalyst and packed in a part of the catalytic combustion tube downstream of the fuel inlet part, the first catalyst has an identical structure to the platinum-loaded alumina catalyst included in the dehydrogenation catalyst and is configured to spontaneously ignite the purge gas discharged from the PSA device in the fuel inlet part, the platinum-loaded alumina catalyst comprises:

an alumina carrier; and platinum loaded on the alumina carrier, wherein the alumina carrier comprises a γ-alumina carrier that has a surface area of 200 $m^2/g$ or more, a pore volume of 0.50 $cm^3/g$ or more, and an average pore diameter in a range of 60 to 150 Å, with pores having a pore diameter in a range of ±30 Å from the average pore diameter occupying 60% or more of a total pore volume, particles of the platinum are loaded on the γ-alumina carrier in a range of 0.1 to 1.5% by weight calculated as elemental platinum (Pt), and 70% or more of the particles of the platinum have a size of 8 to 15 Å by direct observation using a transmission electron microscope.

2. The hydrogen station according to claim 1, wherein the heat medium is hot oil.

3. The hydrogen station according to claim 1, wherein air is supplied to the catalytic combustion tube at multiple different parts in a divided manner.

4. The hydrogen station according to claim 1, further comprising:

a dispenser that supplies the hydrogen purified by the PSA device to a moving body equipped with a fuel cell;

a precooler that cools the hydrogen supplied from the dispenser by use of a coolant; and a gas-liquid separator that separates the reaction product gas into gas and liquid, wherein in the gas-liquid separator, the reaction product gas is cooled by the coolant supplied from the precooler.

5. The hydrogen station according to claim 1, wherein in the dehydrogenation reaction, hydrogen and toluene are produced by dehydrogenation of cyclohexane as the hydrogenated aromatic, the hydrogen station further comprises:

a first tank storing the cyclohexane; and a second tank storing the toluene, and the first tank and the second tank are each disposed underground.

6. The hydrogen station according to claim 5, wherein at least one of a gas-phase gas in the first tank and a gas-phase gas in the second tank is supplied to the catalytic combustion tube as the fuel together with the purge gas discharged from the PSA device.

7. The hydrogen station according to claim 6, wherein at least one of the gas-phase gas in the first tank and the gas-phase gas in the second tank is introduced, together with air, to a fuel inlet part of the catalytic combustion tube to which the fuel is introduced.

8. The hydrogen station according to claim 1, wherein the catalytic combustion tube is a coil filled with the combustion catalyst.

9. The hydrogen station according to claim 1, wherein the hydrogenated aromatic is one member or a mixture of two or more members selected from the group consisting of a hydride of monocyclic aromatic, a hydride of bicyclic aromatic, and a hydride of compound having 3 or more aromatic rings.

10. The hydrogen station according to claim 1, wherein the hydrogenated aromatic is one member or a mixture of two or more members selected from the group consisting of methylcyclohexane, cyclohexane, trimethylcyclohexane, decalin, and dibenzotriol.

* * * * *